(12) United States Patent
Cheng et al.

(10) Patent No.: US 11,451,343 B2
(45) Date of Patent: Sep. 20, 2022

(54) MESSAGE RE-TRANSMISSION IN A GROUP OF DEVICES

(71) Applicant: QUALCOMM Incorporated, San Diego, CA (US)

(72) Inventors: Hong Cheng, Bridgewater, NJ (US); Tien Viet Nguyen, Bridgewater, NJ (US); Sudhir Kumar Baghel, Hillsborough, NJ (US); Kapil Gulati, Hillsborough, NJ (US); Junyi Li, Chester, NJ (US); Zhibin Wu, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 16/680,036

(22) Filed: Nov. 11, 2019

(65) Prior Publication Data
US 2020/0153559 A1 May 14, 2020

Related U.S. Application Data

(60) Provisional application No. 62/760,856, filed on Nov. 13, 2018.

(51) Int. Cl.
*H04L 1/18* (2006.01)
*H04L 5/00* (2006.01)
(Continued)

(52) U.S. Cl.
CPC .......... *H04L 1/1819* (2013.01); *H04L 1/1845* (2013.01); *H04L 5/0055* (2013.01);
(Continued)

(58) Field of Classification Search
CPC ... H04L 1/1819; H04L 1/1845; H04L 5/0055; H04W 4/70; H04W 4/40; H04W 28/0268
See application file for complete search history.

(56) References Cited

U.S. PATENT DOCUMENTS 9,876,611 B2 * 1/2018 Choi ..................... H04L 1/1867
2017/0150299 A1 * 5/2017 Coutinho .............. H04L 1/1819
(Continued)

FOREIGN PATENT DOCUMENTS

KR 101965767 B1 4/2019
WO 2018129017 A2 7/2018

OTHER PUBLICATIONS

Huawei, et al., "Support for Vehicular Communications in NR", 3GPP Draft, 3GPP TSG RAN WG1 Meeting #86, R1-166118, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22, 2016-Aug. 26, 2016, Aug. 21, 2016 (Aug. 21, 2016), XP051140069, 7 Pages, Retrieved from the Internet: URL: http://www.3gpp.org/ftp/Meetings_3GPP_SYNC/RAN1/Docs/, [retrieved on Aug. 21, 2016], pp. 2, 4, 5, figure 3.

(Continued)

*Primary Examiner* — Michael Thier
*Assistant Examiner* — Nevena Zecevic Sandhu
(74) *Attorney, Agent, or Firm* — ArentFox Schiff LLP

(57) ABSTRACT

A device receives a coded message from a re-transmitting device designated by one or more devices for performing message re-transmission on their behalf. The coded message encodes a first message and a second message, where the receiving device has failed to receive at least the second message. The receiving device further receives a coding-based re-transmission indicator indicating that the coded message is configured as a coding-based re-transmission of two or more previously transmitted messages that are encoded together in the coded message. The receiving device recovers the second message by decoding the coded message. In another aspect, a re-transmitting device is designated by one or more devices for performing message (Continued)

re-transmission on behalf of the devices. The device generates a coded message that encodes a first and a second message; and transmits the coded message and an indicator indicating that the coded message is a coding-based re-transmission.

30 Claims, 10 Drawing Sheets

(51) Int. Cl.
  *H04W 4/40* (2018.01)
  *H04W 28/02* (2009.01)
  *H04W 4/70* (2018.01)
(52) U.S. Cl.
  CPC ............... *H04W 4/40* (2018.02); *H04W 4/70* (2018.02); *H04W 28/0268* (2013.01)

(56) References Cited

U.S. PATENT DOCUMENTS

| | | | |
|---|---|---|---|
| 2017/0367027 A1* | 12/2017 | Wu | H04L 45/42 |
| 2018/0146491 A1* | 5/2018 | Kim | H04W 72/1231 |
| 2019/0158227 A1 | 5/2019 | Gupta et al. | |
| 2021/0152306 A1* | 5/2021 | Liu | H04W 84/047 |
| 2021/0274357 A1* | 9/2021 | Furuichi | H04W 16/14 |
| 2021/0306824 A1* | 9/2021 | Li | H04W 72/1263 |

OTHER PUBLICATIONS

International Search Report and Written Opinion—PCT/US2019/061018—ISAEPO—dated Mar. 30, 2020.
Kim J., et al., "Feasibility of Index-Coded Retransmissions for Enhancing Sidelink Channel Efficiency of V2X Communications", IEEE Access, vol. 7, 2019, pp. 6545-6552. DOI: 10.1109/ACCESS.2018.2888586.

* cited by examiner

MESSAGE RE-TRANSMISSION IN A GROUP OF DEVICES

CROSS REFERENCE TO RELATED APPLICATION(S)

This application claims the benefit of U.S. Provisional Application Ser. No. 62/760,856, entitled "MESSAGE RE-TRANSMISSION IN A GROUP OF DEVICES" and filed on Nov. 13, 2018, which is expressly incorporated by reference herein in its entirety.

BACKGROUND

Technical Field

The present disclosure relates generally to communication systems, and more particularly, to message re-transmission in a group of devices in a wireless communication system, such as a vehicular communication system or an integrated access and backhaul (IAB) system.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology, as the need for high reliability communications may be constrained by limited availability of network resources.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, apparatuses, and computer-readable mediums for wireless communication are disclosed by the present disclosure.

In an aspect, a method of wireless communication at a receiving device includes receiving, from a re-transmitting device designated by one or more devices for performing at least one message re-transmission on behalf of the one or more devices (e.g., without any respective re-transmissions of at least a first message and a second message that were previously transmitted), a coded message that encodes at least a first message and a second message, where the receiving device has failed to receive at least the second message from one of the one or more devices. The method further includes receiving, from the re-transmitting device, a coding-based re-transmission indicator indicating that the coded message is configured as a coding-based re-transmission of two or more previously transmitted messages that are encoded together in the coded message. The method further includes recovering, in response to receiving the coding-based re-transmission indicator, at least the second message by decoding the coded message.

In a further aspect, a method of wireless communication at a re-transmitting device includes determining that the re-transmitting device is designated by one or more devices for performing at least one message re-transmission on behalf of the one or more devices. The method further includes generating a coded message that encodes at least a first message and a second message previously transmitted by the one or more devices. The method further includes transmitting the coded message (e.g., without any respective re-transmissions of at least the first message and the second message). The method further includes transmitting a coding-based re-transmission indicator indicating that the coded message is configured as a coding-based re-transmission of two or more previously transmitted messages that are encoded together in the coded message.

In another aspect, a receiving device for wireless communication includes a memory storing instructions, and a processor in communication with the memory. The processor is configured to receive, from a re-transmitting device designated by one or more devices for performing at least one message re-transmission on behalf of the one or more devices (e.g., without any respective re-transmissions of at least a first message and a second message that were previously transmitted), a coded message that encodes at least a first message and a second message, where the receiving device has failed to receive at least the second message from one of the one or more devices. The processor is further configured to receive, from the re-transmitting device, a coding-based re-transmission indicator indicating that the coded message is configured as a coding-based re-transmission of two or more previously transmitted messages that are encoded together in the coded message. The processor is further configured to recover, in response to receiving the coding-based re-transmission indicator, at least the second message by decoding the coded message.

In yet a further aspect, a re-transmitting device for wireless communication includes a memory storing instructions, and a processor in communication with the memory. The processor is configured to determine that the re-transmitting device is designated by one or more devices for performing at least one message re-transmission on behalf of the one or more devices. The processor is further configured to generate a coded message that encodes at least a first message and a second message previously transmitted by the one or more devices. The processor is further configured to transmit the coded message (e.g., without any respective re-transmissions of at least the first message and the second message). The processor is further configured to transmit a coding-based re-transmission indicator indicating that the coded message is configured as a coding-based re-transmission of two or more previously transmitted messages that are encoded together in the coded message.

In another aspect, a non-transitory computer-readable medium stores computer executable code that, when executed by a processor of a receiving device, causes the receiving device to receive, from a re-transmitting device designated by one or more devices for performing at least one message re-transmission on behalf of the one or more devices (e.g., without any respective re-transmissions of at least a first message and a second message that were previously transmitted), a coded message that encodes at least a first message and a second message, where the receiving device has failed to receive at least the second message from one of the one or more devices. The processor is further configured to receive, from the re-transmitting device, a coding-based re-transmission indicator indicating that the coded message is configured as a coding-based re-transmission of two or more previously transmitted messages that are encoded together in the coded message. The processor is further configured to recover, in response to receiving the coding-based re-transmission indicator, at least the second message by decoding the coded message.

In a further aspect, a non-transitory computer-readable medium stores computer executable code that, when executed by a processor of a re-transmitting device, causes the re-transmitting device to determine that the re-transmitting device is designated by one or more devices for performing at least one message re-transmission on behalf of the one or more devices. The processor is further configured to generate a coded message that encodes at least a first message and a second message previously transmitted by the one or more devices. The processor is further configured to transmit the coded message (e.g., without any respective re-transmissions of at least the first message and the second message). The processor is further configured to transmit a coding-based re-transmission indicator indicating that the coded message is configured as a coding-based re-transmission of two or more previously transmitted messages that are encoded together in the coded message.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
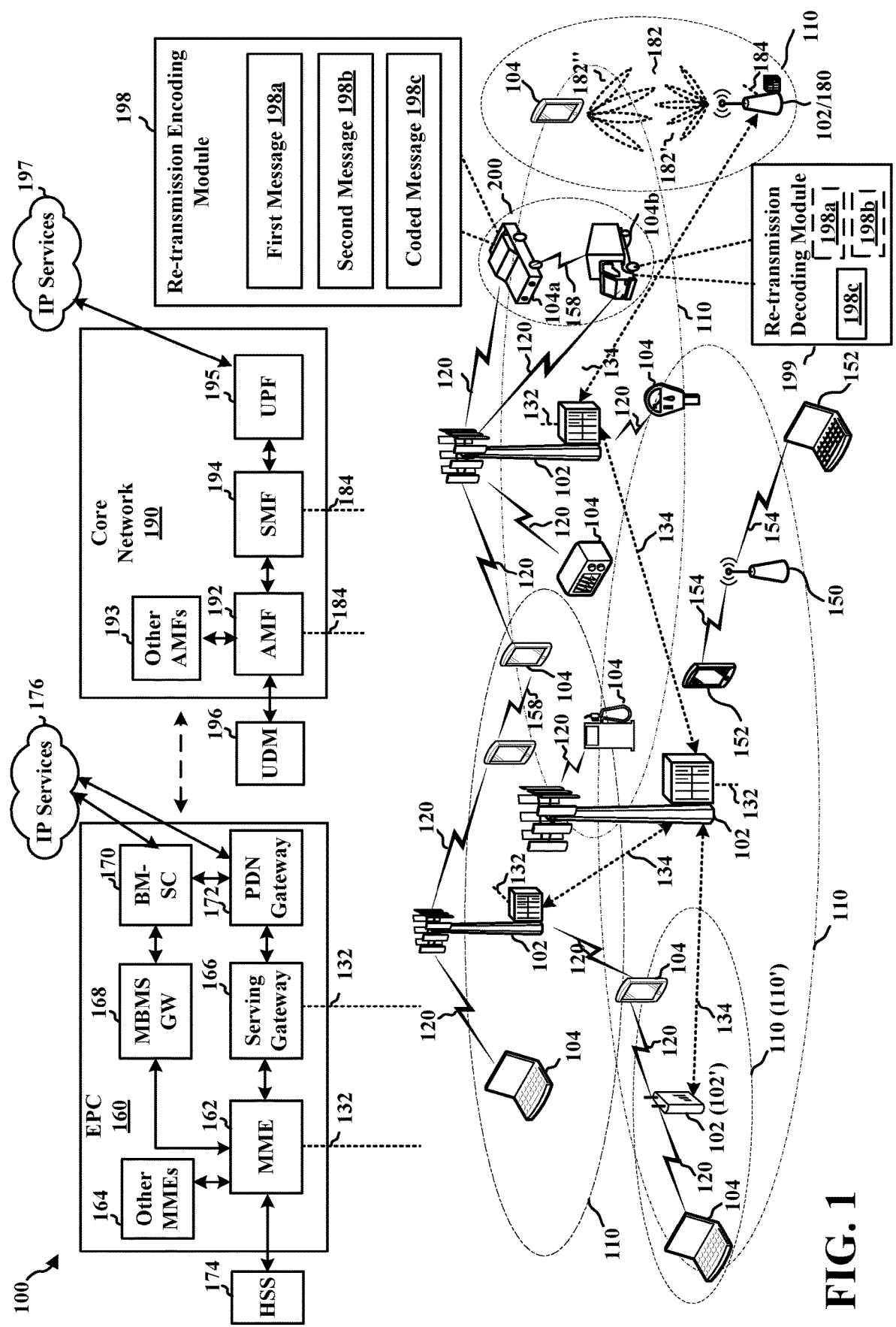
FIG. 1 is a schematic diagram of an example wireless communications system that includes an access network, according to some aspects.

The present aspects provide an efficient message re-transmission mechanism in a group of devices (e.g., a platoon of vehicles, a group of Integrated Access and Backhaul (IAB) nodes, etc.) in a wireless communication system (e.g., including vehicular systems such as vehicle-to-vehicle (V2V) and/or vehicle-to-everything (V2X) networks and/or enhanced vehicle-to-everything (eV2X) networks, a radio access network (RAN) implementing IAB communication, etc.).

In accordance with one non-limiting example aspect of the described methods and features thereof, in a device-to-device (D2D) communications system, a designated re-transmitting device (e.g., a UE, a relay, a vehicle platoon leader, a road side unit (RSU), etc.) may generate a coded message that encodes two or more messages which were previously transmitted to a group of devices, such as UEs. The re-transmitting device may then transmit the coded message to the group of devices (e.g., without any respective or separate, individual re-transmissions of at least the first message and the second message), so that each one of the two or more messages does not need to be individually and separately re-transmitted by a respective original transmitting device.

In accordance with another non-limiting example aspect of the described methods and features thereof, in an IAB system, a re-transmitting device, such as a relay or an IAB node, may generate a coded message that encodes two or more messages which were previously transmitted in the IAB system by the child IAB nodes of the re-transmitting device. The re-transmitting device may then transmit the coded message to one or more receiving devices, so that each one of the two or more messages does not need to be individually re-transmitted by a respective original transmitting node/device/UEs. For example, in one non-limiting aspect, the re-transmitting device may be an IAB node or a relay that transmits the coded message to one or more devices, e.g., UEs, over a UE-to-Universal Mobile Telecommunications System (UMTS) link (Uu link) in an IAB downlink communication.

Thus, aspects of the present disclosure may conserve network resources and/or meet high communication reliability requirements.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts. Although the following description may be focused on 5G NR, the concepts described herein may be applicable to other similar areas, such as LTE, LTE-A, CDMA, GSM, and other wireless technologies.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Referring to FIG. 1, an example of a wireless communications system 100 that defines an access network and includes UEs 104 (also referred to as communication devices, or devices) that may be configured for combining messages for re-transmission for communication with other UEs (or devices) 104. For example, in an aspect, some UEs 104 may be configured for performing V2X communications with other UEs 104, for example, over D2D communication links 158 in a D2D communications system 200. The UEs 104 may include various devices related to vehicles and transportation. For example, the UEs 104 may include vehicles, devices within vehicles, and transportation infrastructure such as roadside devices, tolling stations, fuel supplies, or any other device that may communicate with a vehicle.

In particular, the UEs 104 are configured to implement coding-based re-transmission to conserve network resources and/or meet the high reliability requirements of V2V and/or V2X communications in the D2D communications system 200. For example, in an aspect, the UEs 104 in the D2D communications system 200 may include a re-transmitting device 104a that implements a re-transmission encoding module 198 configured to receive (or transmit) at least a first message 198a and a second message 198b that were previously transmitted in a platooning group of UEs 104 in the D2D communications system 200. The first message 198a and the second message 198b may have been previously transmitted by any UEs in the platooning group of UEs 104, and the re-transmitting device 104a can be one of the previously transmitting UEs or any other UE designated to perform the re-transmitting. The re-transmitting device 104a may be further configured to encode the first message 198a and the second message 198b into a coded message 198c, and then transmit the coded message 198c to the platooning group of UEs 104. As a result, each one of the first message 198a and the second message 198b does not need to be re-transmitted individually, e.g., by the original transmitting UE or any other UE, yet the transmission of the coded message 198c, which includes the first message 198a and the second message 198b, enables the first message 198a and the second message 198b to meet the high reliability requirements of V2V or V2X communications.

The UEs 104 in the D2D communications system 200 may further include a receiving device 104b that implements a re-transmission decoding module 199 that is able to decode the coded message 198c. The receiving device 104b is configured to receive the coded message 198c and use at least the coded message 198c to recover at least one of the first message 198a or the second message 198b that were transmitted by other UEs 104 but not received by the receiving device 104b. For example, the receiving device 104b can use a received one of the first message 198a or the second message 198b in combination with the decoded version of the coded message 198c to retrieve the non-received one of the first message 198a or the second message 198b.

Further details of the D2D communications system 200, the re-transmitting device 104a, the receiving device 104b, and the features of the present disclosure are described below with reference to FIGS. 4-10.

Still referring to FIG. 1, the wireless communications system 100 (also referred to as a wireless wide area network (WWAN)) further includes base stations 102, an Evolved Packet Core (EPC) 160, and another core network 190 (e.g., a 5G Core (5GC)). The base stations 102 may include macro cells (high power cellular base station) and/or small cells (low power cellular base station). The small cells include femtocells, picocells, and microcells. The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with the core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate with each other indirectly (e.g., through the EPC 160 or the core network 190) or directly over backhaul links 134 (e.g., X2 interface). The backhaul links 132, 134, 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cells and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

As mentioned above, certain UEs 104 may communicate with each other using device-to-device (D2D) communication link 158, e.g., including synchronization signals. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR. Additionally, the D2D communication link 158 may be implemented in vehicular systems, such as vehicle-to-vehicle (V2V) and/or vehicle-to-everything (V2X) networks and/or enhanced vehicle-to-everything (eV2X) networks.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage and/or increase capacity of the access network.

A base station 102, whether a small cell 102' or a macro cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range or band of 30 GHz to 300 GHz and a wavelength between 1 millimeter and 10 millimeters. Radio waves in the range or band may be referred to as a millimeter wave. Near mmW may extend down to a frequency of 3 GHz with a wavelength of 100 millimeters. The super high frequency (SHF) range or band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway (GW) 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include services provided by the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
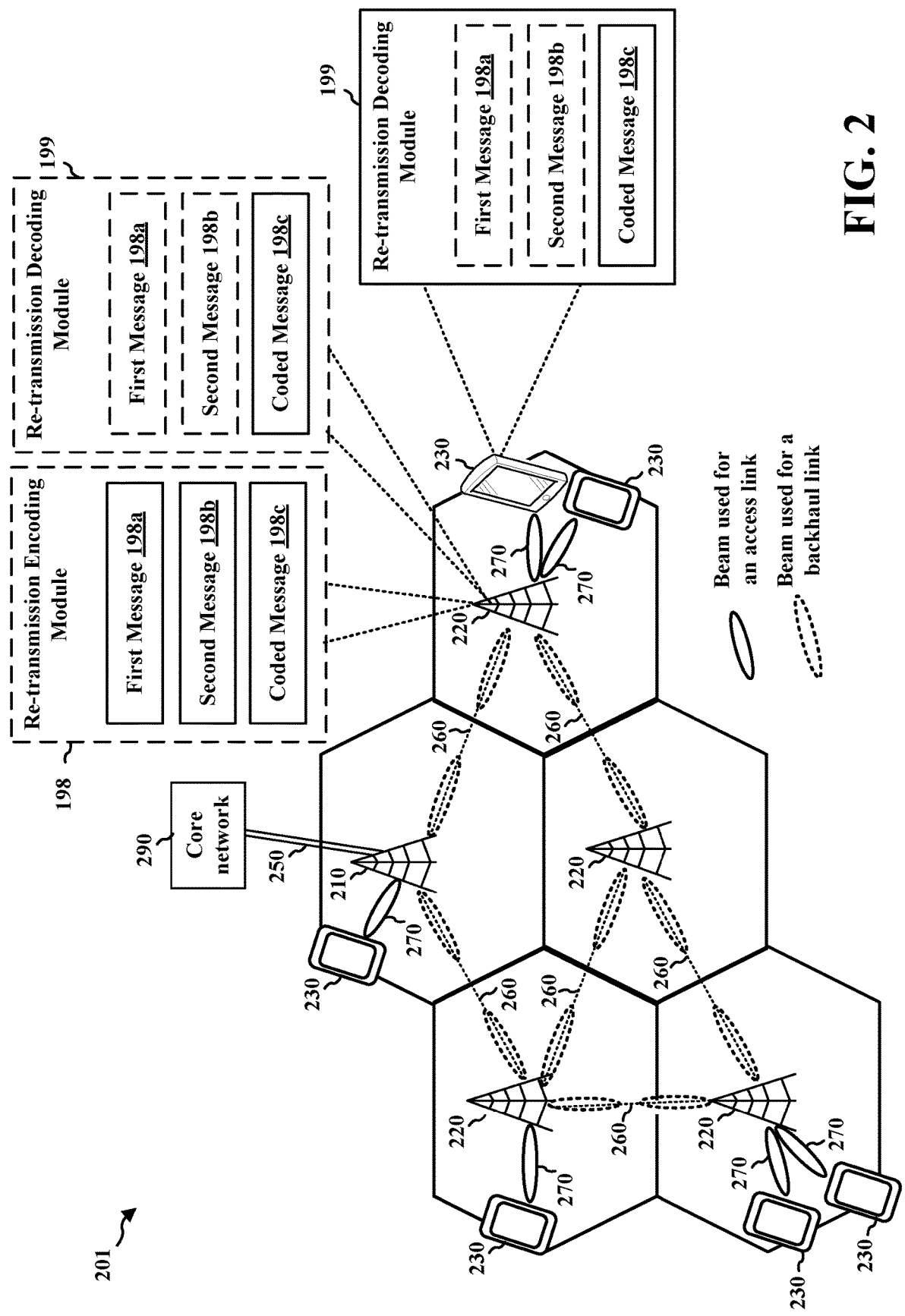
FIG. 2 is a schematic diagram of an example integrated access and backhaul (IAB) network, according to some aspects.

In one non-limiting aspect, one or more of the UEs 104 and base stations 102/180 may implement an IAB system where base stations 102/180 may include a backhaul interface for communication with a backhaul portion of the wireless communications system 100. Referring to FIG. 2, for example, in one non-limiting aspect, an IAB system 201 may include an anchor node (that may be referred to herein as an "IAB donor node") 210 and access nodes (that may be referred to herein as "IAB nodes" or "IAB non-donor nodes") 220. The IAB donor node 210 may be a base station, such as a base station 102, e.g., a gNB or eNB as described with reference to FIG. 1, and may perform functions to control the IAB system 201. The IAB nodes 220 may comprise L2 relay nodes, UEs, or any other component/device that can receive and transmit a message. Together, the IAB donor node 210 and the IAB nodes 220 share resources to provide an access network and a backhaul network to core network 290, which may be the core network 190 in FIG. 1. For example, resources may be shared between access links 270 and backhaul links 260 in the IAB system 201.

The IAB system 201 further include UEs 230 (which may be similar or the same as UEs 104 in FIG. 1) that interface with the IAB nodes 220 or the IAB donor node 210 through access links 270. The IAB nodes 220 communicate with each other and with the IAB donor node 210 through backhaul links 260. The IAB donor node 210 is connected to the core network 290 via a wireline backhaul link 250. UEs 230 may communicate with the core network 290 by relaying messages through their respective access link 270 to the IAB donor node 210 or the IAB nodes 220 (e.g., the IAB system 201), the latter of which then may relay the message through backhaul links 260 to the IAB donor node 210 to communicate to the core network 290 through the wireline backhaul link 250. Similarly, the core network 290 may communicate with a UE 230 by sending a message to the IAB donor node 210 through the wireline backhaul link 250. The IAB donor node 210 sends the message via backhaul links 260 to the IAB node 220 connected to the UE 230, and the IAB node 220 sends the message to the UE 230 via the access link 270.

In one non-limiting aspect, for example, one or more IAB nodes 210, 220 in the IAB system 201 may implement a re-transmission encoding module 198 and may act the same as the re-transmitting device 104a as described with reference to FIG. 1 above to encode and re-transmit multiple messages transmitted by other IAB nodes 210, 220 in the IAB system 201. Further, one or more of the IAB nodes 210, 220 in the IAB system 201 may implement a re-transmission decoding module 199 and may act the same as the receiving device 104b as described with reference to FIG. 1 above to decode encoded re-transmissions received from other IAB nodes 210, 220 in the IAB system 201. Additionally, one or more of the UEs 230 in the IAB system 201 may implement the re-transmission decoding module 199 and may act the same as the receiving device 104b as described with reference to FIG. 1 above to decode encoded re-transmissions received from an IAB node 210, 220 over a Uu link in a downlink communication. Further details of the operation of an IAB node 210, 220 to provide functionality as a UE or a base station are described below with reference to respective components in FIG. 3.

Figure 3:
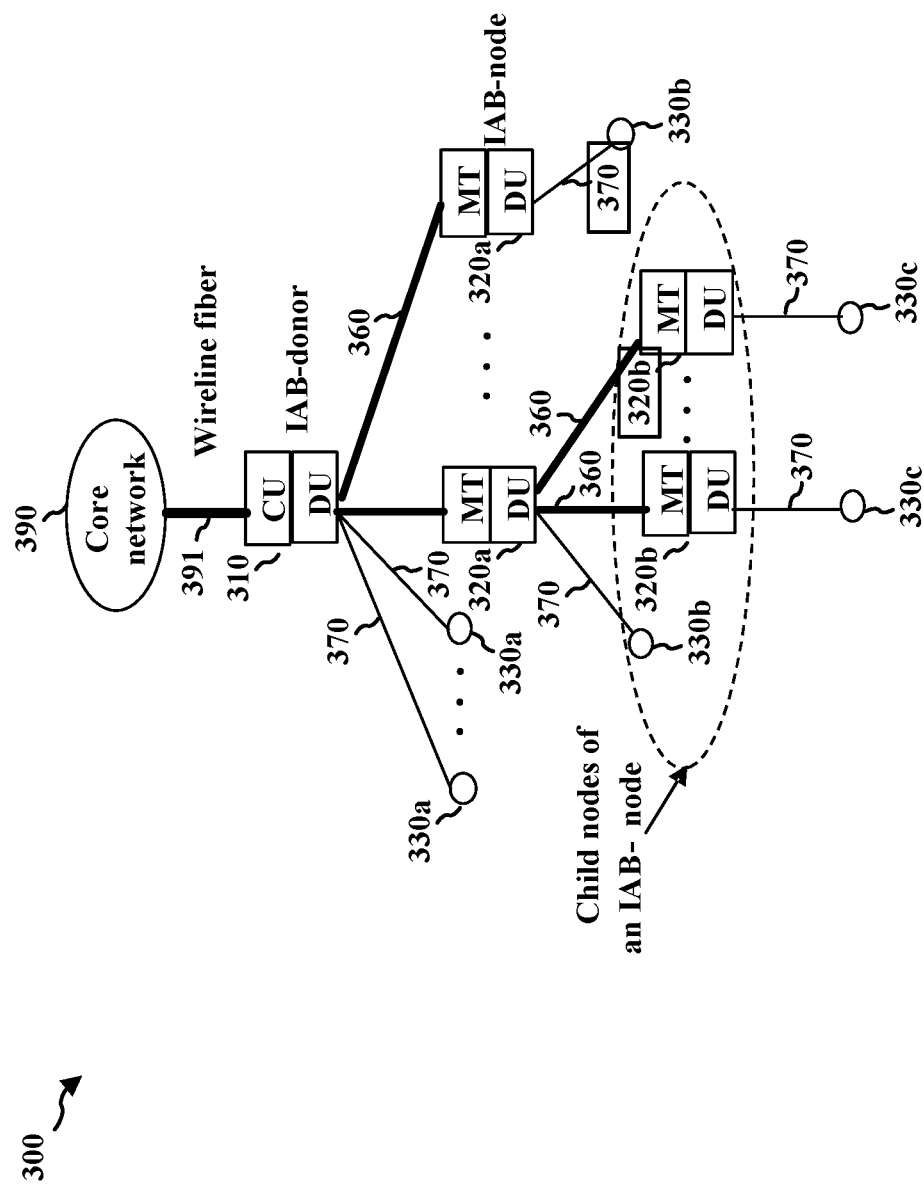
FIG. 3 is a schematic diagram of an example IAB system and components thereof, according to some aspects.

FIG. 3 is a diagram illustrating an IAB system 300 and components thereof. The IAB system 300 includes an IAB donor node 310 (which may be the same or similar to IAB donor node 210 in FIG. 2) and IAB nodes 320a, 320b (also referred to as IAB non-donor nodes, which may be the same or similar to IAB nodes 220 in FIG. 2). The IAB nodes 320, as well as the IAB donor node 310, may provide wireless access links to UEs 330a, 330b, 330c (which may be the same or similar to UEs 230 in FIG. 2). The IAB donor node 310 may be considered a root node of the tree structure of the IAB system 300. The IAB donor node 310 may be connected to the core network 390 (which may be the same or similar to core network 290 in FIG. 2) via a wired connection 391. The wired connection may comprise, e.g., a wireline fiber. The IAB donor node 310 may provide a connection to one or more IAB nodes 320a. The IAB nodes 320a may each be referred to as a child node of the IAB donor node 310. The IAB donor node 310 may also provide a connection to one or more UE 330a, which may be referred to as a child UE of IAB donor node 310. The IAB donor node 310 may be connected to its child IAB nodes 320a via backhaul links 360, and may be connected to the child UEs 330a via access links 370. The IAB nodes 320a that are children nodes of IAB donor node 310 may also have IAB node(s) 320b and/or UE(s) 330b as children. For example, IAB nodes 320b may further connect to child nodes and/or child UEs. FIG. 3 illustrates IAB nodes 320b providing an access link 370 to UEs 330c, respectively.

The IAB donor node 310 may include a central unit (CU) and a distributed unit (DU). The central unit CU may provide control for the child IAB nodes 320a, 320b in the IAB system 300. For example, the CU may configure the IAB system 300. The CU may perform radio resource control (RRC)/packet data convergence protocol (PDCP) layer functions. The DU may perform scheduling. For example, the DU may schedule resources for communication by the child IAB nodes 320a and/or UEs 330a of the IAB donor node 310. The child IAB nodes 320a, 320b may include a mobile termination (MT) and a DU. The MT of the child IAB node 320a may operate as a scheduled node, scheduled similar to a UE by the DU of the parent node, e.g., IAB donor node 310. The MT of the child IAB node 320b may operate as a scheduled node of a corresponding parent node, e.g., a corresponding child IAB node 320a. The DU of the child IAB node 320a may schedule the child IAB nodes 320b and UEs 330b of the child IAB node 320a.

Figure 4:
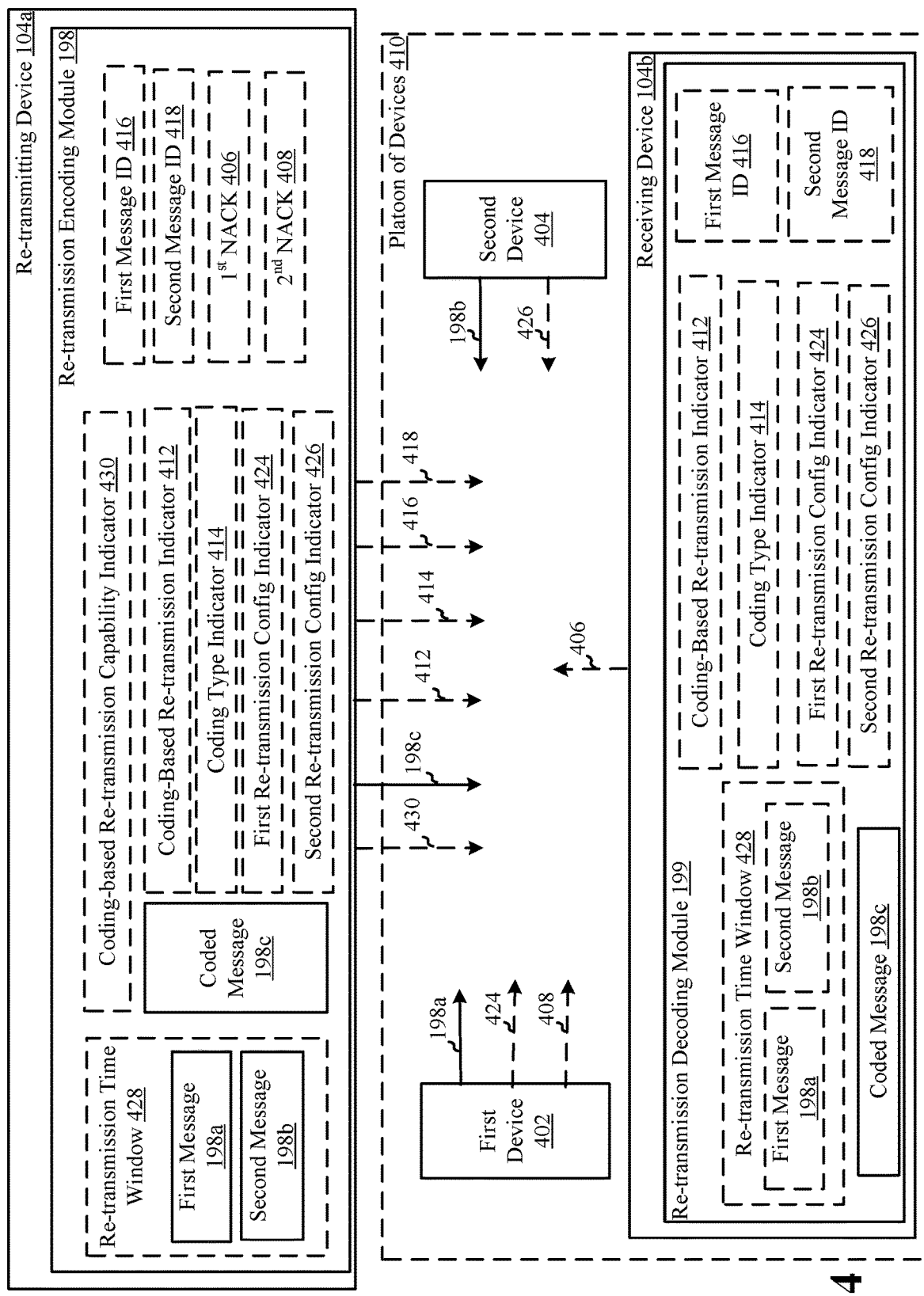
FIG. 4 is a schematic diagram of an example communication system that may form a part of the wireless communications system and access network of FIG. 1 or a part of the IAB system of FIG. 2 and/or FIG. 3, according to some aspects.

Referring to FIG. 4, an example communications system 400 (which may be the same as or may include at least a portion of the D2D communications system 200 in FIG. 1 or the IAB system 201 in FIG. 2) includes a re-transmitting device 104a which may be or may include the re-transmitting device 104a as described above with reference to FIG. 1 or an IAB node 210, 220 as described above with reference to FIG. 2. The communications system 400 further includes a receiving device 104b which may be or may include a UE 1 as described above with reference to FIG. 1 or an IAB node 210, 220 or a UE 230 as described above with reference to FIG. 2.

The communications system 400 further includes a first device 402 that sends the first message 198a and a second device 404 that sends the second message 198b. Each one of the first device 402 or the second device 404 may be or may include a UE 104 as described above with reference to FIG. 1 or an IAB node 210, 220 as described above with reference to FIG. 2.

In one non-limiting aspect, at least the first device 402, the second device 404, and the receiving device 104b correspond to a group of IAB nodes that communicate among each other in an IAB system 201 (FIG. 2). In another non-limiting aspect, at least the first device 402, the second device 404, and the receiving device 104b form a platoon of devices 410 that communicate among each other in a D2D communications system 200 (FIG. 1). In the following, aspects of the communications system 400 are described as applicable to the components in the D2D communications system 200 (FIG. 1) performing V2X communication, and the communications system 400 may be referred to as the D2D communications system 400. However, the below aspects are similarly applicable to the corresponding components in the IAB system 201 (FIG. 2) performing IAB communication. For example, aspects described below with reference to a platoon of devices 410 are similarly applicable to a group of IAB nodes that communicate with each other in the IAB system 201 (FIG. 2).

In one non-limiting aspect, the D2D communications system 400 may include a platoon of devices 410. The platoon of devices 410 may include, for example, a group of moving or stationary UEs within a threshold range of one another, where each UE has acknowledged participation in the platooning group, such as to enhance communications between the members of the group. In an aspect, for example, the platoon of devices 410 is a platoon of vehicles. Although illustrated with the first device 402 and the second device 404 respectively transmitting the first message 198a and the second message 198b, it should be understood that any of the devices in the platoon of devices 410 may transmit at least one of the messages, but that the receiving device 104b fails to receive at least one of the messages. In an aspect, when some of the devices in the D2D communications system 400 are vehicular UEs, or when the messages transmitted are V2X related messages, the D2D communications system 400 is an instance of a V2X communications system.

The re-transmitting device 104a may be responsible for re-transmitting a combination of two or more messages to members of the platoon of devices 410. In an aspect, the re-transmitting device 104a may be a relay or a road-side unit (RSU), which may be associated with the platoon of devices 410 (e.g., based on geographic proximity and coverage area). However, in alternative or additional aspects, the re-transmitting device 104a may also be a UE/vehicle in the platoon of devices 410. For example, in an aspect, the re-transmitting device 104a may be a platoon leader (e.g., a UE/vehicle that manages the platoon of devices 410) in the platoon of devices 410. In this case, for example, the re-transmitting device 104a may receive the first message 198a and the second message 198b, encode at least the first message 198a and the second message 198b into the coded message 198c, and send the coded message 198c to the platoon of devices 410. The encoding of the coded message 198c will be explained below in more detail.

The receiving device 104b is a member of the platoon of devices 410 that is configured to retrieve a previously sent but not received message through use of the coded message 198c. For example, in this case, the receiving device 104b receives and decodes the coded message 198c. In an aspect, using at least one previously received message that is contained/encoded within the coded message 198c, the receiving device 104b is configured to decode the coded message 198c and retrieve the previously sent but not received one of the first message 198a and the second message 198b, as will be explained below in more detail.

In an aspect, the first device 402 transmits the first message 198a to the receiving device 104b, and the second device 404 transmits the second message 198b to the receiving device 104b, according to enhanced vehicle to everything (eV2X) communications. Generally, the requirements for supporting eV2X operation include high reliability, for example, as defined in 3GPP TS 22.186. For example, the key performance indicators (KPIs) defined in 3GPP TS 22.186 for eV2X call for high reliability ranging from 90% to 99.999% for extended sensor sharing and up to 99.99% reliability for corporative driving for platoon groups. Generally, some UEs/vehicles may not receive a particular message due to interference and/or link situations and/or the high speed of the vehicles in V2X communications. Accordingly, a single transmission of a message may not be sufficient to meet the eV2X reliability requirements, and message re-transmission may be necessary and even unavoidable. Unlike some other communications that are scheduled by a network, V2V and V2X/eV2X communications are distributed transmissions and do not implement a central feedback mechanism or other control on the transmissions. Therefore, message re-transmissions in V2V and V2X/eV2X communications may be performed blindly, i.e., without any information that can serve as a reference to decide whether a message has been properly received. For example, in some solutions, each UE may be configured with a re-transmission counter indicating the number of re-transmissions to perform for every message transmitted by that UE. If every UE blindly performs re-transmissions of every message, more radio resources, such as bandwidth, will be used for each message. Due to the limited V2X spectrum, blind re-transmission of every message may cause interference and therefore degrade the performance and reliability of V2X communication.

The present disclosure may avoid resource constraint issues while satisfying communication reliability requirements, however, through use of the coded message 198c. For example, the re-transmitting device 104a receives two or more messages transmitted in the platoon of devices 410, including the first message 198a and the second message 198b, encodes the messages into the coded message 198c, and then re-transmits the coded message 198c to the platoon of devices 410. Using this technique, each one of the two or more messages does not need to be re-transmitted individually to meet high reliability requirements of message communications in the D2D communications system 400. Also, using this technique, the first device 402 no longer needs to blindly re-transmit the first message 198a even if the first message 198a requires high reliability, and the second device 404 no longer needs to blindly re-transmit the second message 198b even if the second message 198b requires high reliability. Further, since transmission of the coded message 198c takes the place of the individual re-transmission of the first message 198a and the second message 198b, transmission of the coded message 198c results in a reduction in the total number of messages transmitted in the platoon of devices 410. Such reduction in messaging traffic in turn reduces interference and the overall usage of radio resources, and leads to improvement of the overall reliability in the D2D communications system 400.

In an aspect, a high percentage of messages, for example 90% or more of messages, may be properly received in V2X communications in the platoon of devices 410, for example, by the receiving device 104b, due to the formation of the platoon of devices 410. That is, the receiving device 104b may not continuously fail message reception but may occasionally fail to receive some messages due to interference or other network conditions. Accordingly, in some aspects, a coding-based re-transmission may be implemented by using an efficient decoding scheme that may, in some implementations, use partial message information for decoding the coded message 198c. An example of an efficient coding/decoding mechanism that uses partial message information for decoding is "exclusive OR" or "XOR" cipher, although other encryption algorithms that operate according to this principle may also be used.

For example, in an aspect, the receiving device 104b may successfully receive the first message 198a from the first device 402 but fail to receive the second message 198b from the second device 404. The receiving device 104b may cache the first message 198a and use the first message 198a to decode the coded message 198c so as to derive the second message 198b from the coded message 198c. Further, if the first device 402 that transmitted the first message 198a fails to receive the second message 198b, the first device 402 may use the first message 198a to decode the coded message 198c so as to derive the second message 198b from the coded message 198c. Similarly, if the second device 404 that transmitted the second message 198b fails to receive the first message 198a, the second device 404 may use the second message 198b to decode the coded message 198c so as to derive the first message 198a from the coded message 198c. Accordingly, each UE in the platoon of devices 410 may use partial message information for decoding the coded message 198c and recovering a failed message.

In some alternative aspects, coding-based re-transmission may be implemented by using a coding scheme that does not use partial message information for decoding the coded message 198c. For example, in an aspect, the re-transmitting device 104a may use a reversible coding that allows the receiving device 104b to decode the coded message 198c into the first message 198a and the second message 198b even when the receiving device 104b has failed to receive both the first message 198a and the second message 198b. Examples of a coding mechanism that uses a reversible coding may include, but are not limited to, a coding scheme that is based on multiplexing (in time, frequency, space, etc.), public or private key encryption, reversible compression, etc.

In an optional aspect of the present disclosure, the first device 402 may further transmit a first re-transmission configuration indicator 424 to indicate that the first message 198a is subject to coding-based re-transmission. For example, upon reception of the first message 198a and the first re-transmission configuration indicator 424, the re-transmitting device 104a may determine that the re-transmission of the first message 198a is not performed by the first device 402 and instead the first device 402 is delegating the re-transmission of the first message 198a to the re-transmitting device 104a. In an aspect, subsequent to transmitting the first message 198a and the first re-transmission configuration indicator 424, the first device 402 will disable any default re-transmissions of the first message 198a and will not re-transmit the first message 198a since such re-transmissions are delegated to the re-transmitting device 104a. The second device 404 may implement similar functionality regarding a second re-transmission configuration indicator 426 for the second message 198b.

In another optional aspect of the present disclosure, the first re-transmission configuration indicator 424 sent by the first device 402 may additionally or alternatively indicate a coding type to use for coding-based re-transmission of the first message 198a. Alternatively, the first device 402 may send an indicator separate from, and/or in addition to, the first re-transmission configuration indicator 424 to indicate a coding type to use for coding-based re-transmission of the first message 198a. In an aspect, the re-transmitting device 104a can receive the first re-transmission configuration indicator 424 that indicates the coding type to use for coding-based re-transmission of the first message 198a, identify the corresponding coding, and then use the coding to encode the first message 198a and one or more other messages into the coded message 198c. However, in alternative aspects, the first re-transmission configuration indicator 424 may not need to identify the coding to be used for coding-based re-transmission of the first message 198a, and a pre-determined and agreed-upon coding may be used by the re-transmitting device 104a to encode the first message 198a and one or more other messages into the coded message 198c. The second device 404 may implement similar functionality regarding the second re-transmission configuration indicator 426 for the second message 198b.

In another alternative or additional optional aspect, the first re-transmission configuration indicator 424 sent by the first device 402 may further indicate that the re-transmitting device 104a is selected for performing coding-based re-transmission of the first message 198a. Alternatively, the first device 402 may send an indicator separate from, and/or in addition to, the first re-transmission configuration indicator 424 to indicate that the re-transmitting device 104a is selected for performing coding-based re-transmission of the first message 198a. In an aspect, if there are multiple entities/devices available to the first device 402 and each of the multiple entities/devices is capable of performing coding-based re-transmission of messages in the D2D communications system 400, the first device 402 may send the first re-transmission configuration indicator 424 to indicate which one of the available devices/entities, e.g., the re-transmitting device 104a, should perform coding-based re-transmission of the first message 198a.

In an aspect, for example, at any time prior to transmitting the first message 198a, the first device 402 may decide which one of the available coding-based re-transmission-capable devices/entities should perform coding-based re-transmission of the first message 198a. In an aspect, such a decision may be configured as part of the platoon formation procedure of the platoon of devices 410, or such a decision may be dynamically announced within the platoon operations in the platoon of devices 410. Alternatively, in some aspects, the devices/entities that are capable of performing coding-based re-transmission services may announce such capability, for example, via a separate broadcast message to all the platoon members in the platoon of devices 410, as described below with reference to the coding-based re-transmission capability indicator 430.

In an aspect, for example, if there are multiple relays/RSUs with overlapping coverage in the D2D communications system 400, a different identifier (ID) may be associated with each available relay or RSU, and the first re-transmission configuration indicator 424 sent by the first device 402 may include the ID of a particular relay or RSU selected or designated to perform coding-based re-transmission of the first message 198a. The second device 404 may implement similar functionality regarding the second re-transmission configuration indicator 426 for the second message 198b.

In an aspect, based on QoS requirements, such as the reliability requirements or configuration information from the network, the first device 402 may determine whether to request coding-based re-transmission for the first message 198a and/or whether to transmit any required indicators/indications for coding-based re-transmission of the first message 198a. For example, in an aspect, the first device 402 may determine whether the QoS requirements for the first message 198a are above a threshold and such QoS requirements cannot be achieved with a single transmission and therefore re-transmission is expected, and thus to request coding-based re-transmission for the first message 198a. In another example, the first device 402 may determine that the QoS requirements for the first message 198a map to the coding-based re-transmission scheme of this disclosure, e.g., based on mapping information stored at the first device 402. In a further example, the first device 402 may receive configuration information from the network, including the QoS requirements for the first message 198a and including instructions to initiate the coding-based re-transmission scheme of this disclosure.

In an optional aspect, the first re-transmission configuration indicator 424 sent by the first device 402 may additionally or alternatively include information indicating the QoS requirements configured to trigger the re-transmitting device 104a to perform coding-based re-transmission of the first message 198a. Alternatively, the first device 402 may send an indicator separate from, and/or in addition to, the first re-transmission configuration indicator 424 to indicate the QoS requirements configured to trigger the re-transmitting device 104a to perform coding-based re-transmission of the first message 198a. The second device 404 may implement similar functionality regarding the QoS requirements and the need for coding-based re-transmissions regarding the second re-transmission configuration indicator 426 for the second message 198b.

In some cases, if the re-transmitting device 104a receives one or more of the above-noted indications/indicators regarding the first message 198a, the re-transmitting device 104a may only combine and encode the first message 198a with the second message 198b (or any other messages) if similar/corresponding indications/indicators are also received regarding the second message 198b (or any other messages).

In an aspect, the original transmitting UEs will not re-transmit the original messages if they are aware that the re-transmitting device 104a capable of combining and encoding messages is available. For example, the first device 402 may determine to delegate the re-transmission of the first message 198a if the first device 402 is aware that a coding device, such as the re-transmitting device 104a, is available and capable of performing coding-based re-transmission of the first message 198a. The second device 404 may implement similar functionality regarding the second message 198b. For instance, the re-transmitting device 104a, which may be a relay, an RSU, or another UE in the platoon of devices 410, may send a broadcast message, including a coding-based re-transmission capability indicator 430, to the platoon of devices 410 to indicate that the re-transmitting device 104a is available for re-transmitting messages on behalf of other UEs in the platoon of devices 410 and can support coding-based re-transmission for messages transmitted by other UEs in the platoon of devices 410.

In some implementations, UEs 104 receiving a message may be triggered to store received messages for use in retrieving a missed message from a coded message based on indicators in the received message. For example, the receiving device 104b may successfully receive the first message 198a and determine, based on the first re-transmission configuration indicator 424 also received from the first device 402 regarding the first message 198a, that the first message 198a is subject to coding-based re-transmission. In other words, the first re-transmission configuration indicator 424 conveys information that the first message 198a may be encoded and re-transmitted with one or more other messages. In response to receiving the first re-transmission configuration indicator 424, the receiving device 104b may cache the first message 198a so that the receiving device 104b may later use the first message 198a to decode any subsequently received coded messages, such as the coded message 198c, in order to recover other messages that the receiving device 104b may have failed to receive, such as the second message 198b. Accordingly, the first re-transmission configuration indicator 424 received by the receiving device 104b from the first device 402 regarding the first message 198a causes a behavioral change in the receiving device 104b. The second device 404 may send the second re-transmission configuration indicator 426 corresponding to the second message 198b and cause similar behavioral change in the receiving device 104b regarding the second message 198b.

In an aspect, the re-transmitting device 104a may also transmit one or more indicators or identifiers in or with or referenced to the coded message 198c. For example, the re-transmitting device 104a may transmit a coding-based re-transmission indicator 412 with the coded message 198c to indicate that the coded message 198c is configured as a coding-based re-transmission of two or more previously transmitted messages that are encoded together in the coded message 198c. The re-transmitting device 104a may also transmit combined-message identification information, such as respective message identifiers (IDs) of each of the messages that are encoded/combined into the coded message 198c.

For example, when the re-transmitting device 104a encodes at least the first message 198a and the second message 198b into the coded message 198c, the re-transmitting device 104a may also transmit at least the corresponding two message IDs to identify the first message 198a and the second message 198b that are encoded into the coded message 198c, e.g., a first message ID 416 of the first message 198a and a second message ID 418 of the second message 198b. In an aspect, the message IDs of the first message 198a and the second message 198b are encrypted or compressed, and then transmitted by the re-transmitting device 104a, such as in a field of the coded message 198c. The re-transmitting device 104a may also transmit a coding type indicator 414 to indicate the coding used to combine the two or more messages into the coded message 198c. For example, the re-transmitting device 104a may include the coding type indicator 414 as a part of the coded message 198c, or separately but with a reference to the coded message 198c. For instance, in response to receiving the coding type indicator 414, the receiving device 104b may use the indicator to identify the coding and reverse the coding to recover at least one of the combined messages. However, in some aspects, if such coding is agreed-upon or standardized, there may be no need to indicate the coding type used for generating the coded message 198c.

In alternative or additional implementations, the coding-based re-transmission functionality described herein may be used in conjunction with acknowledgement (ACK) and/or negative acknowledgment (NACK) functionality. In cases where explicit message reception or non-reception is desired, the coding-based re-transmission functionality described herein may be utilized to combine based on ACK or NACK messages. For instance, in a NACK implementation, the re-transmitting device 104a may combine messages that have no overlapping NACKs from UEs (i.e., no UE has missed more than one of the combined messages) to ensure successful recovery of the message.

For example, and still referring to FIG. 4, when the receiving device 104b successfully receives the first message 198a from the first device 402 but fails to receive the second message 198b from the second device 404, the receiving device 104b may send a first NACK 406 indicating that the receiving device 104b has failed to receive the second message 198b. Similarly, in case the first device 402 also fails to receive the second message 198b from the second device 404, the first device 402 may also send a second NACK 408 indicating that the first device 402 has also failed to receive the second message 198b. In these aspects, the re-transmitting device 104a may use the first NACK 406 and/or the second NACK 408 to decide which messages to encode together for coding-based re-transmission.

In another example, where the coded message 198c encodes "N" messages and prior knowledge of "N−1" of those messages is required to recover the remaining message from the coded message 198c, the re-transmitting device 104a may combine/encode the "N" messages into the coded message 198c if the "N" messages have no overlapping NACKs from UEs in the platoon of devices 410. That is, the re-transmitting device 104a may combine/encode the "N" messages into the coded message 198c if no other UE in the platoon of devices 410 has missed more than one of the "N" messages. Or, to say it another way, the re-transmitting device 104a may combine/encode the "N" messages into the coded message 198c if each UE in the platoon of devices 410 has successfully received at least "N−1" of the "N" messages. Accordingly, the re-transmitting device 104a ensures successful recovery of the combined messages in the coded message 198c by all other devices in the platoon of devices 410.

For example, in aspects where the coded message 198c encodes two messages (e.g., the first message 198a and the second message 198b), and prior knowledge of one of those messages is used to recover the other message from the coded message 198c, the re-transmitting device 104a may combine the first message 198a and the second message 198b into the coded message 198c if each other member of the platoon of devices 410 sends a NACK regarding at most one of the first message 198a and the second message 198b but not for both the first message 198a and the second message 198b.

In contrast, for example, if the re-transmitting device 104a receives NACKs from the receiving device 104b regarding both the first message 198a and the second message 198b, then the re-transmitting device 104a will not combine the first message 198a and the second message 198b into the coded message 198c. Instead, the re-transmitting device 104a may re-transmit each one of the first message 198a and the second message 198b separately. Alternatively, the re-transmitting device 104a may separately combine each of the first message 198a and the second message 198b with other messages for which no NACK has been received.

As another example, the re-transmitting device 104a may combine the first message 198a and the second message 198b into the coded message 198c when no other device in the platoon of devices 410 NACKs more than one of the first message 198a and the second message 198b. For example, in the aspect illustrated in FIG. 4, the first NACK 406 and/or the second NACK 408 have been received by the re-transmitting device 104a for the second message 198b, but no NACK has been received for the first message 198a. Therefore, the re-transmitting device 104a combines the first message 198a and the second message 198b into the coded message 198c and transmits the coded message 198c.

Yet further, in aspects where the coded message 198c encodes two or more messages and no prior knowledge of those two or more messages is required to decode the coded message 198c in order to recover the two or more messages from the coded message 198c, the re-transmitting device 104a may combine/encode the two or more messages into the coded message 198c even if another device in the platoon of devices 410 has missed more than one of the two or more messages.

In an additional or alternative optional aspect, the re-transmitting device 104a may be a vehicle such as a platoon leader of the platoon of devices 410. Generally, one or more UEs may form a platooning group, or simply a platoon, and manage such a platoon in the D2D communications system 400 which may include a vehicular communication network such as a V2V/V2X and/or an eV2X network. For example, the re-transmitting device 104a may desire to form the platoon of devices 410 including one or more other UEs, such as the first device 402, the second device 404, and the receiving device 104b, to utilize the advantages and benefits of operating as a platooning group. In an aspect, the re-transmitting device 104a may volunteer to become the platoon leader of the platoon of devices 410 and facilitate coordination between members traveling together as the platoon of devices 410. In order to do so, the re-transmitting device 104a may advertise services and configurations during a discovery procedure in the platoon of devices 410 to discover other members of the platoon of devices 410. In an aspect, for example, the re-transmitting device 104a may broadcast discovery signals to the platoon of devices 410 to allow other devices/UEs/vehicles in the platoon of devices 410, such as the first device 402, the second device 404, and the receiving device 104b, to discover services offered by the re-transmitting device 104a.

In an aspect, the discovery signals may include a discovery preamble indicating that the re-transmitting device 104a is capable of communicating (e.g., offering a service). For example, the discovery preamble may be a pre-defined sequence selected from a set of pre-defined sequences. The selection of the pre-defined sequence may convey a limited amount of information. For example, the discovery preamble may be selected based on a type of the re-transmitting device 104a or a type of service offered by the re-transmitting device 104a. In an aspect, the re-transmitting device 104a may transmit the discovery message in response to receiving a query from a member of the platoon of devices 410, such as the first device 402, the second device 404, or the receiving device 104b.

In an aspect, for example, the re-transmitting device 104a may be the platoon leader of the platoon of devices 410 and may announce coding-based re-transmission capability in a platoon application or during platoon forming, so that other members of the platoon of devices 410, such as the first device 402 and/or the second device 404, can decide whether to delegate re-transmission of their messages to the re-transmitting device 104a. In an aspect, for example, the re-transmitting device 104a may broadcast discovery signals that include a discovery preamble indicating that the re-transmitting device 104a is capable of performing coding-based re-transmission on behalf of other UEs. In an aspect, the re-transmitting device 104a may perform coding-based re-transmission for all other vehicles/UEs/devices that are members of the platoon of devices 410.

Optionally, in some alternative or additional aspects, the messaging required for coding-based re-transmission may be implemented at different communication layers and/or across multiple communication layers. For example, the present aspects may be implemented at a low layer such as the medium access control (MAC) layer or the physical (PHY) layer, or at an upper layer such as the V2X layer or the application layer. In an aspect, the messaging for coding-based re-transmission in one layer may be performed more efficiently by further using cross-layer interactions. For example, some information related to the coding-based re-transmission of a message may be obtained from the headers of another layer, and therefore it may not be necessary to include such information in the re-transmission of the message itself. For example, in an aspect, the messaging for coding-based re-transmission may be performed in the V2X layer or in the application layer, and any indications/indicators described herein with reference to coding-based re-transmission may be communicated in the headers of a different communication layer. In an aspect, for example, the message IDs and the indicators/indications related to coding-based re-transmission of the first message 198a and/or the second message 198b do not have to be communicated in the headers of the communication layer used for transmitting the first message 198a, the second message 198b, and/or the coded message 198c.

In an aspect, platoon management in the platoon of devices 410 may be implemented by application layer protocols. For example, in an aspect, platoon management in the platoon of devices 410 may be defined by an upper layer protocol such as Society of Automotive Engineers (SAE) or European Telecommunications Standards Institute-Intelligent Transport Systems (ETSI-ITS) defined message contents. In an aspect, for example, SAE defined and/or ETSI-ITS defined messages support platoon formation and platoon management functions that may be re-used for implementing coding-based re-transmission functionality. In some aspects, for a UE to join a group such as the platoon of devices 410, the UE needs to sense the platoon management signaling in the application layer and contact the platoon leader of the platoon of devices 410. Within such signaling exchanges, the platoon leader may inform the UE regarding the capability for coding-based re-transmission within the platoon of devices 410. After the UE joins the platoon of devices 410, any message the UE transmits may include an indicator in a separate/different layer to indicate that the message is communicated in the platoon of devices 410 and is subject to coding-based re-transmission. In an aspect, a similar functionality may be used for selecting a device/UE/vehicle for performing coding-based re-transmission of messages in the platoon of devices 410. For example, the platoon leader may designate a particular device/UE/vehicle to perform coding-based re-transmission on behalf of the members of the platoon of devices 410, and the platoon leader may inform the members of the platoon of devices 410 of such designation.

Optionally, in an alternative or additional aspect, coding-based re-transmission is applied only to messages communicated within a re-transmission time window 428, e.g., a recent time window defined by a time period relative to a current time, so as to reduce the required caching and message ID size. Or, in a case where the time window might be after the current time and the current time might refer to the time at which the first message 198a is received, then the re-transmission time window 428 may be a time window defined by a time period relative to a current time at which the first message 198a is received. For example, in aspects where the coded message 198c encodes two messages, and prior knowledge of one of those messages is required to recover the other message from the coded message 198c, the re-transmitting device 104a may combine the first message 198a and the second message 198b into the coded message 198c if: (1) each other member of the platoon of devices 410 sends a NACK regarding at most one of the first message 198a and the second message 198b, and (2) the first message 198a and the second message 198b are both received within the re-transmission time window 428. Accordingly, the receiving device 104b only needs to cache the messages received within the re-transmission time window 428, and may discard/ignore any cached messages that have been received prior to the re-transmission time window 428. In an aspect, for example, the re-transmission time window 428 may be a programmable delay block (PDB) with a delay bound. For example, for a PDB of 100 msec, in aspects where the coded message 198c encodes two messages and prior knowledge of one of those messages is required to recover the other message from the coded message 198c, the receiving device 104b only needs to cache the messages received in the platoon of devices 410 in the most recent 100 msec time window, since the re-transmitting device 104a will only combine/encode messages transmitted in the platoon of devices 410 in the most recent 100 msec time window.

In an alternative or additional aspect, the re-transmitting device 104a may not perform coding-based re-transmission immediately after receiving a message that is subject to coding-based re-transmission. Instead, in this case, the re-transmitting device 104a may wait to receive other messages that are subject to coding-based re-transmission, and then decide which messages to combine/encode and/or how to combine/encode the messages to achieve better efficiency. For example, upon receiving the first message 198a, the re-transmitting device 104a may wait for the PDB time of the first message 198a before performing coding-based re-transmission of the first message 198a with other messages. Accordingly, the re-transmitting device 104a may combine the first message 198a with as many other messages as possible without downgrading the QoS of the transmissions.

In an aspect, in V2X communications in the D2D communications system 400, all the devices/UEs/vehicles are synchronized for message transmission, and therefore the time window limit for applying coding-based re-transmission, e.g., the re-transmission time window 428, may also be based on an absolute time.

In an aspect, a UE in the platoon of devices 410 may clear its cache over the re-transmission time window 428 if the UE properly receives all the expected messages in the platoon of devices 410, and may maintain its cache over the re-transmission time window 428 if the UE determines that some messages are not properly received in the platoon of devices 410. For example, in an aspect, the receiving device 104b may determine that the second message 198b is not properly received if the receiving device 104b receives the control bits of the second message 198b but is not able to decode the data in the second message 198b. In an aspect, if the receiving device 104b cannot even decode the control bits of the second message 198b, the receiving device 104b may determine that the receiving device 104b is too far away from other devices of the platoon of devices 410 and is therefore not supposed to receive the second message 198b. In an aspect, the receiving device 104b maintains its cache irrespective of the success/failure in receiving messages.

In an aspect, the number and/or the choice of messages that are encoded/combined in the coded message 198c may be limited by how many messages can be successfully recovered at the receiving device 104b under the coding type used to generate the coded message 198c. In an aspect, the number and/or the choice of messages that are encoded/combined in the coded message 198c may be alternatively or additionally limited by the size of a recent time window within which the receiving device 104b caches the received messages and the re-transmitting device 104a combines/encodes messages.

In an aspect, the number and/or the choice of messages that are encoded/combined in the coded message 198c may be alternatively or additionally limited by the probability of each message not being received by a UE in the platoon of devices 410. For example, in an aspect, the re-transmitting device 104a may use the received NACKs to determine the probability of each message not being received by the receiving device 104b. Alternatively or additionally, in an aspect, the re-transmitting device 104a may calculate the probability of each message not being received by the receiving device 104b. For example, in an aspect, the re-transmitting device 104a may estimate such probability based on pre-determined baseline probabilities derived by simulation under various radio conditions, vehicle speeds, range, etc., and based on current network conditions. In an aspect, the re-transmitting device 104a may not combine certain messages if there is a high probability that the messages are going to be continuously dropped by the receiving device 104b. In an aspect, the re-transmitting device 104a may use the estimated probability to determine an expected reliability of the transmission of a message. In an aspect, the re-transmitting device 104a may use the channel utilization ratio or the number of received messages to estimate the density of UEs/devices/vehicles in the D2D communications system 400, and the re-transmitting device 104a may use the estimated density to adjust the coding for performing coding-based re-transmission and/or the number of messages to combine for coding-based re-transmission.

Figure 5:
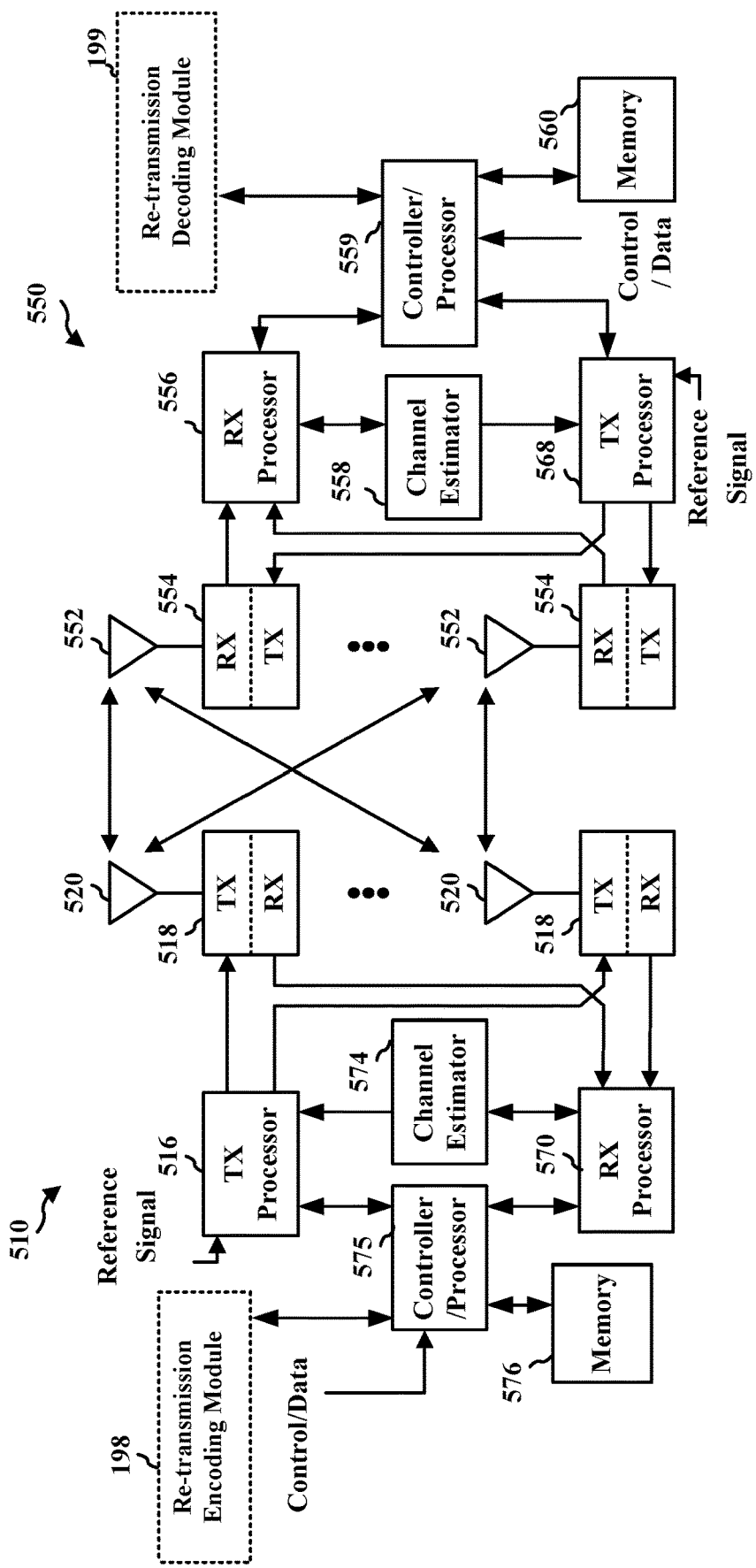
FIG. 5 is a diagram illustrating an example of a base station and a device, such as a UE, in an access network.

FIG. 5 is a block diagram of a base station 510 including a re-transmission encoding module 198 in communication with a UE 550 including a re-transmission decoding module 199 in an access network, where the base station 510 may be the same as or may include at least a portion of an IAB node 210, 220 in FIG. 2, and the UE 550 may be the same as or may include at least a portion of a UE 230 in FIG. 2. In the DL, IP packets from the EPC 160 may be provided to a controller/processor 575. The controller/processor 575 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 575 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 516 and the receive (RX) processor 570 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 516 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the UE 550. Each spatial stream may then be provided to a different antenna 520 via a separate transmitter 518TX. Each transmitter 518TX may modulate an RF carrier with a respective spatial stream for transmission.

At the UE 550, each receiver 554RX receives a signal through its respective antenna 552. Each receiver 554RX recovers information modulated onto an RF carrier and provides the information to the receive (RX) processor 556. The TX processor 568 and the RX processor 556 implement layer 1 functionality associated with various signal processing functions. The RX processor 556 may perform spatial processing on the information to recover any spatial streams destined for the UE 550. If multiple spatial streams are destined for the UE 550, they may be combined by the RX processor 556 into a single OFDM symbol stream. The RX processor 556 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 510. These soft decisions may be based on channel estimates computed by the channel estimator 558. The soft decisions are then decoded and deinterleaved to recover the data and control signals that were originally transmitted by the base station 510 on the physical channel. The data and control signals are then provided to the controller/processor 559, which implements layer 3 and layer 2 functionality.

The controller/processor 559 can be associated with a memory 560 that stores program codes and data. The memory 560 may be referred to as a computer-readable medium. In the DL, the controller/processor 559 provides demultiplexing between transport and logical channels, packet reassembly, deciphering, header decompression, and control signal processing to recover IP packets from the EPC 160. The controller/processor 559 is also responsible for error detection using an ACK and/or NACK protocol to support HARQ operations.

Similar to the functionality described in connection with the DL transmission by the base station 510, the controller/processor 559 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 558 from a reference signal or feedback transmitted by the base station 510 may be used by the TX processor 568 to select the appropriate coding and modulation schemes, and to facilitate spatial processing. The spatial streams generated by the TX processor 568 may be provided to different antenna 552 via separate transmitters 554TX. Each transmitter 554TX may modulate an RF carrier with a respective spatial stream for transmission.

The UL transmission is processed at the base station 510 in a manner similar to that described in connection with the receiver function at the UE 550. Each receiver 518RX receives a signal through its respective antenna 520. Each receiver 518RX recovers information modulated onto an RF carrier and provides the information to a RX processor 570.

The controller/processor 575 can be associated with a memory 576 that stores program codes and data. The memory 576 may be referred to as a computer-readable medium. In the UL, the controller/processor 575 provides demultiplexing between transport and logical channels, packet reassembly, deciphering, header decompression, control signal processing to recover IP packets from the UE 550. IP packets from the controller/processor 575 may be provided to the EPC 160. The controller/processor 575 is also responsible for error detection using an ACK and/or NACK protocol to support HARQ operations.

At least one of the TX processor 568, the RX processor 556, and the controller/processor 559 may be configured to perform aspects in connection with the re-transmission decoding module 199 of a UE 230 in FIG. 2.

At least one of the TX processor 516, the RX processor 570, and the controller/processor 575 may be configured to perform aspects in connection with the re-transmission encoding module 198 and/or the re-transmission decoding module 199 of an IAB node 210, 220 in FIG. 2.

Figure 6:
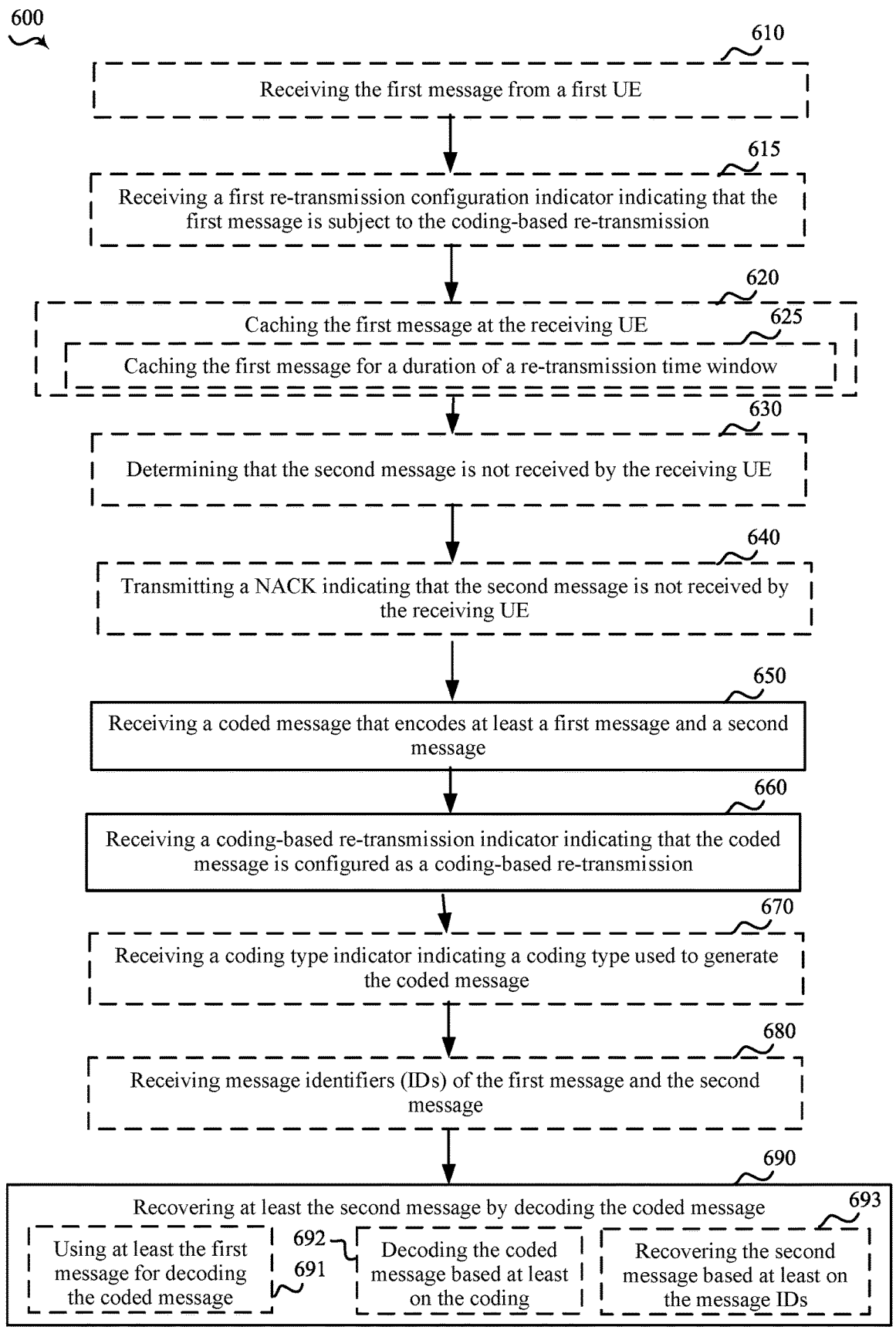
FIG. 6 is a flowchart of a first example method of wireless communication, according to some aspects.

FIG. 6 is a flowchart of a method 600 of wireless communication for a receiving UE. In one non-limiting aspect, for example, the method 600 may be performed by the receiving device 104b that communicates with the re-transmitting device 104a in the D2D communication system 200 in FIG. 1. In this case, the method 600 may be performed by an apparatus such as the receiving device 104b, or more particularly, such as the re-transmission decoding module 199 being executed by a processor 912 of a UE 104 as described herein with reference to FIG. 9 below. In an aspect, for example, the method 600 of wireless communications may be performed by a UE 104 which may include a memory 916 (FIG. 9) and may be the entire UE 104 or a component of the UE 104 such as the re-transmission decoding module 199, the modem 914 (FIG. 9), the processor 912 (FIG. 9), the transceiver 902 (FIG. 9), etc.

In another non-limiting aspect, for example, the method 600 may be performed by a UE 230 that communicates with an IAB node 220 in the IAB system 201 in FIG. 2. In this case, the method 600 may be performed by an apparatus such as the UE 230, or more particularly, such as the re-transmission decoding module 199 being executed by a processor 912 of a UE 104 as described herein with reference to FIG. 9 below. In an aspect, for example, the method 600 of wireless communications may be performed by a UE 104 which may include a memory 916 (FIG. 9) and may be the entire UE 104 or a component of the UE 104 such as the re-transmission decoding module 199, the modem 914 (FIG. 9), the processor 912 (FIG. 9), the transceiver 902 (FIG. 9), etc.

In a further non-limiting aspect, for example, the method 600 may be performed by an IAB node 210, 220 that communicates with another IAB node 210, 220 in the IAB system 201 in FIG. 2. In this case, the method 600 may be performed by an apparatus such as the base station 102, or more particularly, such as the re-transmission decoding module 199 being executed by a processor 1012 of a base station 102 as described herein with reference to FIG. 10 below. In an aspect, for example, the method 600 of wireless communications may be performed by a base station 102 which may include a memory 1016 (FIG. 10) and may be the entire base station 102 or a component of the base station 102 such as the re-transmission decoding module 199, the modem 1014 (FIG. 10), the processor 1012 (FIG. 10), the transceiver 1002 (FIG. 10), etc.

The following description of the method 600 starts at block 650, 660, and 690, since the other blocks are optional.

At block 650, the method 600 may include receiving, from a re-transmitting device designated by one or more UEs for performing at least one message re-transmission on behalf of the one or more UEs, a coded message that encodes at least a first message and a second message, where the receiving UE has failed to receive at least the second message from one of the one or more UEs. For example, in an aspect, the performing of the at least one message re-transmission of the coded message occurs in place of, or without, any respective or separate re-transmissions of at least the first message and the second message that were previously transmitted.

For example, in an aspect, in the D2D communication system 200 in FIG. 1, the receiving device 104*b*, and/or a component of the receiving device 104*b* such as the re-transmission decoding module 199, the modem 914 (FIG. 9), the processor 912 (FIG. 9), the transceiver 902 (FIG. 9), etc., may receive, from the re-transmitting device 104*a* designated by one or more UEs 104 for performing at least one message re-transmission on behalf of the one or more UEs 104, the coded message 198*c* that encodes at least the first message 198*a* and the second message 198*b*, where the receiving device 104*b* has failed to receive at least the second message 198*b* from one of the one or more UEs 104. Accordingly, a receiving device 104*b*, and/or a component of a receiving device 104*b* such as the re-transmission decoding module 199, the modem 914 (FIG. 9), the processor 912 (FIG. 9), or the transceiver 902 (FIG. 9) may provide means for receiving, from a re-transmitting device designated by one or more UEs for performing at least one message re-transmission on behalf of the one or more UEs (e.g., without any respective re-transmissions of at least a first message and a second message that were previously transmitted), a coded message that encodes at least a first message and a second message, wherein the receiving UE has failed to receive at least the second message from one of the one or more UEs.

In another aspect, for example, in the IAB system 201 in FIG. 2, a UE 230, and/or a component of the UE 230 such as the re-transmission decoding module 199, the modem 914 (FIG. 9), the processor 912 (FIG. 9), the transceiver 902 (FIG. 9), etc., may receive, from a re-transmitting IAB node 210 designated by one or more IAB nodes 210, 220 for performing at least one message re-transmission on behalf of the one or more IAB nodes 210, 220, the coded message 198*c* that encodes at least the first message 198*a* and the second message 198*b*, where the UE 230 has failed to receive at least the second message 198*b* from one of the one or more IAB nodes 210, 220. Accordingly, a UE 230, and/or a component of a UE 230 such as the re-transmission decoding module 199, the modem 914 (FIG. 9), the processor 912 (FIG. 9), or the transceiver 902 (FIG. 9) may provide means for receiving, from a re-transmitting device designated by one or more UEs for performing at least one message re-transmission on behalf of the one or more UEs, a coded message that encodes at least a first message and a second message, wherein the receiving UE has failed to receive at least the second message from one of the one or more UEs.

In a further aspect, for example, in the IAB system 201 in FIG. 2, an IAB node 210, 220, and/or a component of an IAB node 210, 220 such as the re-transmission decoding module 199, the modem 1014 (FIG. 10), the processor 1012 (FIG. 10), the transceiver 1002 (FIG. 10), etc., may receive, from another IAB node 210, 220 designated by a group of IAB nodes for performing at least one message re-transmission on behalf of the group of IAB nodes, the coded message 198*c* that encodes at least the first message 198*a* and the second message 198*b*, where the IAB node 210, 220 has failed to receive at least the second message 198*b* from a node in the group of IAB nodes. Accordingly, an IAB node 210, 220, and/or a component of an IAB node 210, 220 such as the re-transmission decoding module 199, the modem 1014 (FIG. 10), the processor 1012 (FIG. 10), or the transceiver 1002 (FIG. 10) may provide means for receiving, from a re-transmitting device designated by one or more UEs for performing at least one message re-transmission on behalf of the one or more UEs, a coded message that encodes at least a first message and a second message, wherein the receiving UE has failed to receive at least the second message from one of the one or more UEs.

In one non-limiting aspect, for example, the transmission of the first message 198*a* and the second message 198*b* may be over the Uu link, while the re-transmission of the coded message 198*c* may be over a sidelink. For example, in an aspect, a relay acting as the re-transmitting device 104*a* may not participate in IAB functionality in the IAB system 201 in FIG. 2, but all the IAB nodes 210, 220 may use an out of band link, e.g., a local connection, to share the messages with the relay for re-transmission. Subsequently, the relay may perform re-transmission encoding and transmit the resulting coded messages 198*c* over the sidelink for all the intended IAB nodes 210, 220 to receive, e.g., via group communication.

At block 660, the method 600 includes receiving, from the re-transmitting device, a coding-based re-transmission indicator indicating that the coded message is configured as a coding-based re-transmission of two or more previously transmitted messages that are encoded together in the coded message.

For example, in an aspect, in the D2D communication system 200 in FIG. 1, the receiving device 104*b*, and/or a component of the receiving device 104*b* such as the re-transmission decoding module 199, the modem 914 (FIG. 9), the processor 912 (FIG. 9), the transceiver 902 (FIG. 9), etc., may receive, from the re-transmitting device 104*a*, a coding-based re-transmission indicator 412 (FIG. 4) indicating that the coded message 198*c* is configured as a coding-based re-transmission of two or more previously transmitted messages that are encoded together in the coded message 198c. Accordingly, a receiving device 104b, and/or a component of a receiving device 104b such as the re-transmission decoding module 199, the modem 914 (FIG. 9), the processor 912 (FIG. 9), or the transceiver 902 (FIG. 9) may provide means for receiving, from the re-transmitting device, a coding-based re-transmission indicator indicating that the coded message is configured as a coding-based re-transmission of two or more previously transmitted messages that are encoded together in the coded message.

In another aspect, for example, in the IAB system 201 in FIG. 2, the UE 230, and/or a component of the UE 230 such as the re-transmission decoding module 199, the modem 914 (FIG. 9), the processor 912 (FIG. 9), the transceiver 902 (FIG. 9), etc., may receive, from the IAB node 220, a coding-based re-transmission indicator 412 (FIG. 4) indicating that the coded message 198c is configured as a coding-based re-transmission of two or more previously transmitted messages that are encoded together in the coded message 198c. Accordingly, a UE 230, and/or a component of a UE 230 such as the re-transmission decoding module 199, the modem 914 (FIG. 9), the processor 912 (FIG. 9), or the transceiver 902 (FIG. 9) may provide means for receiving, from the re-transmitting device, a coding-based re-transmission indicator indicating that the coded message is configured as a coding-based re-transmission of two or more previously transmitted messages that are encoded together in the coded message.

In a further aspect, for example, in the IAB system 201 in FIG. 2, an IAB node 210, 220, and/or a component of an IAB node 210, 220 such as the re-transmission decoding module 199, the modem 1014 (FIG. 10), the processor 1012 (FIG. 10), the transceiver 1002 (FIG. 10), etc., may receive, from another IAB node 210, 220, a coding-based re-transmission indicator 412 (FIG. 4) indicating that the coded message 198c is configured as a coding-based re-transmission of two or more previously transmitted messages that are encoded together in the coded message 198c. Accordingly, an IAB node 210, 220, and/or a component of an IAB node 210, 220 such as the re-transmission decoding module 199, the modem 1014 (FIG. 10), the processor 1012 (FIG. 10), or the transceiver 1002 (FIG. 10) may provide means for receiving, from the re-transmitting device, a coding-based re-transmission indicator indicating that the coded message is configured as a coding-based re-transmission of two or more previously transmitted messages that are encoded together in the coded message.

At block 690, the method 600 includes recovering, in response to receiving the coding-based re-transmission indicator, at least the second message by decoding the coded message.

For example, in an aspect, in the D2D communication system 200 in FIG. 1, in response to receiving the coding-based re-transmission indicator 412 (FIG. 4), the receiving device 104b, and/or a component of the receiving device 104b such as the re-transmission decoding module 199, the modem 914 (FIG. 9), the processor 912 (FIG. 9), the transceiver 902 (FIG. 9), etc., may recover at least the second message 198b by decoding the coded message 198c. Accordingly, a receiving device 104b, and/or a component of a receiving device 104b such as the re-transmission decoding module 199, the modem 914 (FIG. 9), the processor 912 (FIG. 9), or the transceiver 902 (FIG. 9) may provide means for recovering, in response to receiving the coding-based re-transmission indicator, at least the second message by decoding the coded message.

In another aspect, for example, in the IAB system 201 in FIG. 2, in response to receiving the coding-based re-transmission indicator 412 (FIG. 4), the UE 230, and/or a component of the UE 230 such as the re-transmission decoding module 199, the modem 914 (FIG. 9), the processor 912 (FIG. 9), the transceiver 902 (FIG. 9), etc., may recover at least the second message 198b by decoding the coded message 198c. Accordingly, a UE 230, and/or a component of a UE 230 such as the re-transmission decoding module 199, the modem 914 (FIG. 9), the processor 912 (FIG. 9), or the transceiver 902 (FIG. 9) may provide means for recovering, in response to receiving the coding-based re-transmission indicator, at least the second message by decoding the coded message.

In a further aspect, for example, in the IAB system 201 in FIG. 2, in response to receiving the coding-based re-transmission indicator 412 (FIG. 4), an IAB node 210, 220 may recover at least the second message 198b by decoding the coded message 198c. Accordingly, an IAB node 210, 220, and/or a component of an IAB node 210, 220 such as the re-transmission decoding module 199, the modem 1014 (FIG. 10), the processor 1012 (FIG. 10), or the transceiver 1002 (FIG. 10) may provide means for recovering, in response to receiving the coding-based re-transmission indicator, at least the second message by decoding the coded message.

Optionally, only the re-transmitting device may be authorized to re-transmit the first message and the second message. For example, in an aspect, in the D2D communication system 200 in FIG. 1, only the re-transmitting device 104a is authorized to re-transmit the first message 198a and the second message 198b. For example, when the first device 402 (FIG. 4) transmits the first message 198a and delegates re-transmission of the first message 198a to the re-transmitting device 104a, the first device 402 (FIG. 4) itself is no longer authorized to re-transmit the first message 198a, and only the re-transmitting device 104a is authorized to re-transmit the first message 198a. Similarly, when the second device 404 (FIG. 4) transmits the second message 198b and delegates re-transmission of the second message 198b to the re-transmitting device 104a, the second device 404 (FIG. 4) itself is no longer authorized to re-transmit the second message 198b, and only the re-transmitting device 104a is authorized to re-transmit the second message 198b.

Optionally, at block 610 the method 600 may further include receiving the first message from a first UE. For example, in an aspect, in the D2D communication system 200 in FIG. 1, the receiving device 104b, and/or a component of the receiving device 104b such as the re-transmission decoding module 199, the modem 914 (FIG. 9), the processor 912 (FIG. 9), the transceiver 902 (FIG. 9), etc., may receive the first message 198a from the first device 402 (FIG. 4). Accordingly, a receiving device 104b, and/or a component of a receiving device 104b such as the re-transmission decoding module 199, the modem 914 (FIG. 9), the processor 912 (FIG. 9), or the transceiver 902 (FIG. 9) may provide means for receiving the first message from a first UE.

Optionally, at block 615 the method 600 may further include receiving a first re-transmission configuration indicator indicating that the first message is subject to the coding-based re-transmission. For example, in an aspect, in the D2D communication system 200 in FIG. 1, the receiving device 104b, and/or a component of the receiving device 104b such as the re-transmission decoding module 199, the modem 914 (FIG. 9), the processor 912 (FIG. 9), the transceiver 902 (FIG. 9), etc., may receive the first retransmission configuration indicator 424 (FIG. 4) indicating that the first message 198*a* is subject to the coding-based re-transmission. Accordingly, a receiving device 104*b*, and/or a component of a receiving device 104*b* such as the re-transmission decoding module 199, the modem 914 (FIG. 9), the processor 912 (FIG. 9), or the transceiver 902 (FIG. 9) may provide means for receiving a first re-transmission configuration indicator indicating that the first message is subject to the coding-based re-transmission.

Optionally, at block 620 the method 600 may further include caching the first message at the receiving UE in response to receiving the first re-transmission configuration indicator. For example, in an aspect, in the D2D communication system 200 in FIG. 1, the receiving device 104*b*, and/or a component of the receiving device 104*b* such as the re-transmission decoding module 199, the modem 914 (FIG. 9), the processor 912 (FIG. 9), the transceiver 902 (FIG. 9), etc., may cache the first message 198*a* in response to receiving the first re-transmission configuration indicator 424 (FIG. 4) indicating that the first message 198*a* is subject to the coding-based re-transmission. For example, the receiving device 104*b* may cache the first message 198*a* so that the receiving device 104*b* may use the first message 198*a* to later decode coded messages that encode the first message 198*a* with other messages for coding-based re-transmission. Accordingly, a receiving device 104*b*, and/or a component of a receiving device 104*b* such as the re-transmission decoding module 199, the modem 914 (FIG. 9), the processor 912 (FIG. 9), or the transceiver 902 (FIG. 9) may provide means for caching the first message at the receiving UE in response to receiving the first re-transmission configuration indicator.

Optionally, the caching at block 620 may further include block 625, and at block 625 the method 600 may further include caching the first message for a duration of a re-transmission time window, where the coding-based re-transmission is applied only to recent messages received within the re-transmission time window. For example, in an aspect, in the D2D communication system 200 in FIG. 1, the receiving device 104*b*, and/or a component of the receiving device 104*b* such as the re-transmission decoding module 199, the modem 914 (FIG. 9), the processor 912 (FIG. 9), the transceiver 902 (FIG. 9), etc., may cache the first message 198*a* for a duration of the re-transmission time window 428 (FIG. 4), and the coding-based re-transmission is applied only to recent messages received within the re-transmission time window 428 (FIG. 4). For example, the re-transmitting device 104*a* may only encode messages that are received within the re-transmission time window 428 (FIG. 4), and therefore the receiving device 104*b* may only cache messages that are received by the receiving device 104*b* within the re-transmission time window 428 (FIG. 4). Accordingly, a receiving device 104*b*, and/or a component of a receiving device 104*b* such as the re-transmission decoding module 199, the modem 914 (FIG. 9), the processor 912 (FIG. 9), or the transceiver 902 (FIG. 9) may provide means for caching the first message for a duration of a re-transmission time window, where the coding-based re-transmission is applied only to recent messages received within the re-transmission time window.

Optionally, at block 630 the method 600 may further include determining that the second message is not received by the receiving UE. For example, in an aspect, in the D2D communication system 200 in FIG. 1, the receiving device 104*b*, and/or a component of the receiving device 104*b* such as the re-transmission decoding module 199, the modem 914 (FIG. 9), the processor 912 (FIG. 9), the transceiver 902 (FIG. 9), etc., may determine that the second message 198*b* is not received by the receiving device 104*b*. For example, the receiving device 104*b* may be able to detect control bits of the second message 198*b* but may not be able to receive the second message 198*b*. Accordingly, a receiving device 104*b*, and/or a component of a receiving device 104*b* such as the re-transmission decoding module 199, the modem 914 (FIG. 9), the processor 912 (FIG. 9), or the transceiver 902 (FIG. 9) may provide means for determining that the second message is not received by the receiving UE.

Optionally, at block 640 the method 600 may further include transmitting a NACK indicating that the second message is not received by the receiving UE. For example, in an aspect, in the D2D communication system 200 in FIG. 1, the receiving device 104*b*, and/or a component of the receiving device 104*b* such as the re-transmission decoding module 199, the modem 914 (FIG. 9), the processor 912 (FIG. 9), the transceiver 902 (FIG. 9), etc., may transmit the first NACK 406 (FIG. 4) to indicate that the second message 198*b* is not received by the receiving device 104*b*. Accordingly, a receiving device 104*b*, and/or a component of a receiving device 104*b* such as the re-transmission decoding module 199, the modem 914 (FIG. 9), the processor 912 (FIG. 9), or the transceiver 902 (FIG. 9) may provide means for transmitting a NACK indicating that the second message is not received by the receiving UE.

Optionally, the coded message may encode the second message with the first message at least in response to the first message being received by the receiving UE. For example, in an aspect, in the D2D communication system 200 in FIG. 1, the re-transmitting device 104*a* may generate the coded message 198*c* by encoding the second message 198*b* with the first message 198*a* at least in response to the first message 198*a* being received by the receiving device 104*b*.

Optionally, the recovering of at least the second message at block 690 may further include block 691, and at block 691 the method 600 may further include using at least the first message for decoding the coded message. For example, in an aspect, in the D2D communication system 200 in FIG. 1, the receiving device 104*b*, and/or a component of the receiving device 104*b* such as the re-transmission decoding module 199, the modem 914 (FIG. 9), the processor 912 (FIG. 9), the transceiver 902 (FIG. 9), etc., may use at least the first message 198*a* for decoding the coded message 198*c* and recovering the second message 198*b*. Accordingly, a receiving device 104*b*, and/or a component of a receiving device 104*b* such as the re-transmission decoding module 199, the modem 914 (FIG. 9), the processor 912 (FIG. 9), or the transceiver 902 (FIG. 9) may provide means for using at least the first message for decoding the coded message.

Optionally, at block 670 the method 600 may further include receiving a coding type indicator indicating a coding type used to generate the coded message. For example, in an aspect, in the D2D communication system 200 in FIG. 1, the receiving device 104*b*, and/or a component of the receiving device 104*b* such as the re-transmission decoding module 199, the modem 914 (FIG. 9), the processor 912 (FIG. 9), the transceiver 902 (FIG. 9), etc., may receive the coding type indicator 414 (FIG. 4) that indicates the coding type used to encode the first message 198*a* with the second message 198*b* and generate the coded message 198*c*. Accordingly, a receiving device 104*b*, and/or a component of a receiving device 104*b* such as the re-transmission decoding module 199, the modem 914 (FIG. 9), the processor 912 (FIG. 9), or the transceiver 902 (FIG. 9) may provide means for receiving a coding type indicator indicating a coding type used to generate the coded message.

Optionally, the recovering of at least the second message at block 690 may further include block 692, and at block 692 the method 600 may further include decoding the coded message based at least on the coding. For example, in an aspect, in the D2D communication system 200 in FIG. 1, the receiving device 104b, and/or a component of the receiving device 104b such as the re-transmission decoding module 199, the modem 914 (FIG. 9), the processor 912 (FIG. 9), the transceiver 902 (FIG. 9), etc., may decode the coded message 198c based at least on the coding indicated by the coding type indicator 414 (FIG. 4). Accordingly, a receiving device 104b, and/or a component of a receiving device 104b such as the re-transmission decoding module 199, the modem 914 (FIG. 9), the processor 912 (FIG. 9), or the transceiver 902 (FIG. 9) may provide means for decoding the coded message based at least on the coding.

Optionally, at block 680 the method 600 may further include receiving message IDs of the first message and the second message. For example, in an aspect, in the D2D communication system 200 in FIG. 1, the receiving device 104b, and/or a component of the receiving device 104b such as the re-transmission decoding module 199, the modem 914 (FIG. 9), the processor 912 (FIG. 9), the transceiver 902 (FIG. 9), etc., may further receive message IDs from the re-transmitting device 104a, including the first message ID 416 (FIG. 4) that identifies the first message 198a and the second message ID 418 (FIG. 4) that identifies the second message 198b. Accordingly, a receiving device 104b, and/or a component of a receiving device 104b such as the re-transmission decoding module 199, the modem 914 (FIG. 9), the processor 912 (FIG. 9), or the transceiver 902 (FIG. 9) may provide means for receiving message IDs of the first message and the second message.

Optionally, the recovering of at least the second message at block 690 may further include block 693, and at block 693 the method 600 may further include recovering the second message based at least on the message IDs of the first message and the second message. For example, in an aspect, in the D2D communication system 200 in FIG. 1, the receiving device 104b, and/or a component of the receiving device 104b such as the re-transmission decoding module 199, the modem 914 (FIG. 9), the processor 912 (FIG. 9), the transceiver 902 (FIG. 9), etc., may recover the second message 198b based at least on the first message ID 416 (FIG. 4) and the second message ID 418 (FIG. 4). For example, in an aspect, there may be many messages transmitted in the platoon of devices 410 (FIG. 4) in between, before, or after the messages that are encoded/combined in the coded message 198c. In this case, the receiving device 104b may use the received message IDs to determine which messages are being combined/encoded in the coded message 198c. Accordingly, in an aspect, the receiving device 104b may retrieve the cached correctly-received messages and use them for decoding the coded message 198c and recovering the other messages from the coded message 198c. For example, when the receiving device 104b has received and cached the first message 198a but has failed to receive the second message 198b, the receiving device 104b may use the first message ID 416 (FIG. 4) and the second message ID 418 (FIG. 4) to determine that the coded message 198c encodes/combines the first message 198a with the second message 198b. The receiving device 104b may then retrieve the cached first message 198a and use the first message 198a to decode the coded message 198c and recover the second message 198b. Accordingly, a receiving device 104b, and/or a component of a receiving device 104b such as the re-transmission decoding module 199, the modem 914 (FIG. 9), the processor 912 (FIG. 9), or the transceiver 902 (FIG. 9) may provide means for recovering the second message based at least on the message IDs of the first message and the second message.

Optionally, receiving the coded message may include receiving over a D2D communication link in a V2X communication. For example, in an aspect, in the D2D communications system 200, and/or a component of the receiving device 104b such as the re-transmission decoding module 199, the modem 914 (FIG. 9), the processor 912 (FIG. 9), the transceiver 902 (FIG. 9), etc., the coded message 198c may be received from the re-transmitting device 104a over a D2D communication link 158 in a V2X communication. Accordingly, a receiving device 104b, and/or a component of a receiving device 104b such as the re-transmission decoding module 199, the modem 914 (FIG. 9), the processor 912 (FIG. 9), or the transceiver 902 (FIG. 9) may provide means for receiving over a D2D communication link in a V2X communication.

Optionally, the re-transmitting device may be a relay or an RSU. For example, in an aspect, in the D2D communications system 200, the re-transmitting device may be a relay or an RSU.

Optionally, the receiving UE may be part of a platoon including a first UE that transmitted the first message, a second UE that transmitted the second message, and the re-transmitting device, and the re-transmitting device is a platoon leader. For example, in an aspect, in the D2D communications system 200, the receiving device 104b may be part of the platoon of devices 410 (FIG. 4) including the first device 402 (FIG. 4) that transmitted the first message 198a, the second device 404 (FIG. 4) that transmitted the second message 198b, and the re-transmitting device 104a, and the re-transmitting device 104a is the platoon leader in the platoon of devices 410 (FIG. 4).

Optionally, receiving the coded message may include receiving over a Uu link in an IAB downlink communication in a RAN. For example, in an aspect, in the IAB system 201 (FIG. 2), the UE 230, and/or a component of the UE 230 such as the re-transmission decoding module 199, the modem 914 (FIG. 9), the processor 912 (FIG. 9), the transceiver 902 (FIG. 9), etc., may receive the coded message 198c (e.g., from an IAB node 210, 220) over a Uu link in an IAB downlink communication in a RAN. Accordingly, a UE 230, and/or a component of a UE 230 such as the re-transmission decoding module 199, the modem 914 (FIG. 9), the processor 912 (FIG. 9), or the transceiver 902 (FIG. 9) may provide means for receiving over a Uu link in an IAB downlink communication in a RAN.

Optionally, receiving the coded message may include receiving from a relay designated by one or more IAB nodes for performing the at least one message re-transmission on behalf of the one or more IAB nodes. For example, in an aspect, in the IAB system 201 (FIG. 2), the UE 230, and/or a component of the UE 230 such as the re-transmission decoding module 199, the modem 914 (FIG. 9), the processor 912 (FIG. 9), the transceiver 902 (FIG. 9), etc., may receive the coded message 198c from a relay designated by one or more IAB nodes for performing the at least one message re-transmission on behalf of the one or more IAB nodes. For example, in an aspect, in the IAB system 201 (FIG. 2), the one or more devices that designated a re-transmitting device may include one or more IAB nodes 210, 220, and the re-transmitting device may include a relay. Accordingly, a UE 230, and/or a component of a UE 230 such as the re-transmission decoding module 199, the modem 914 (FIG. 9), the processor 912 (FIG. 9), or the transceiver 902 (FIG. 9) may provide means for receiving from a relay designated by one or more IAB nodes for performing the at least one message re-transmission on behalf of the one or more IAB nodes.

Figure 7:
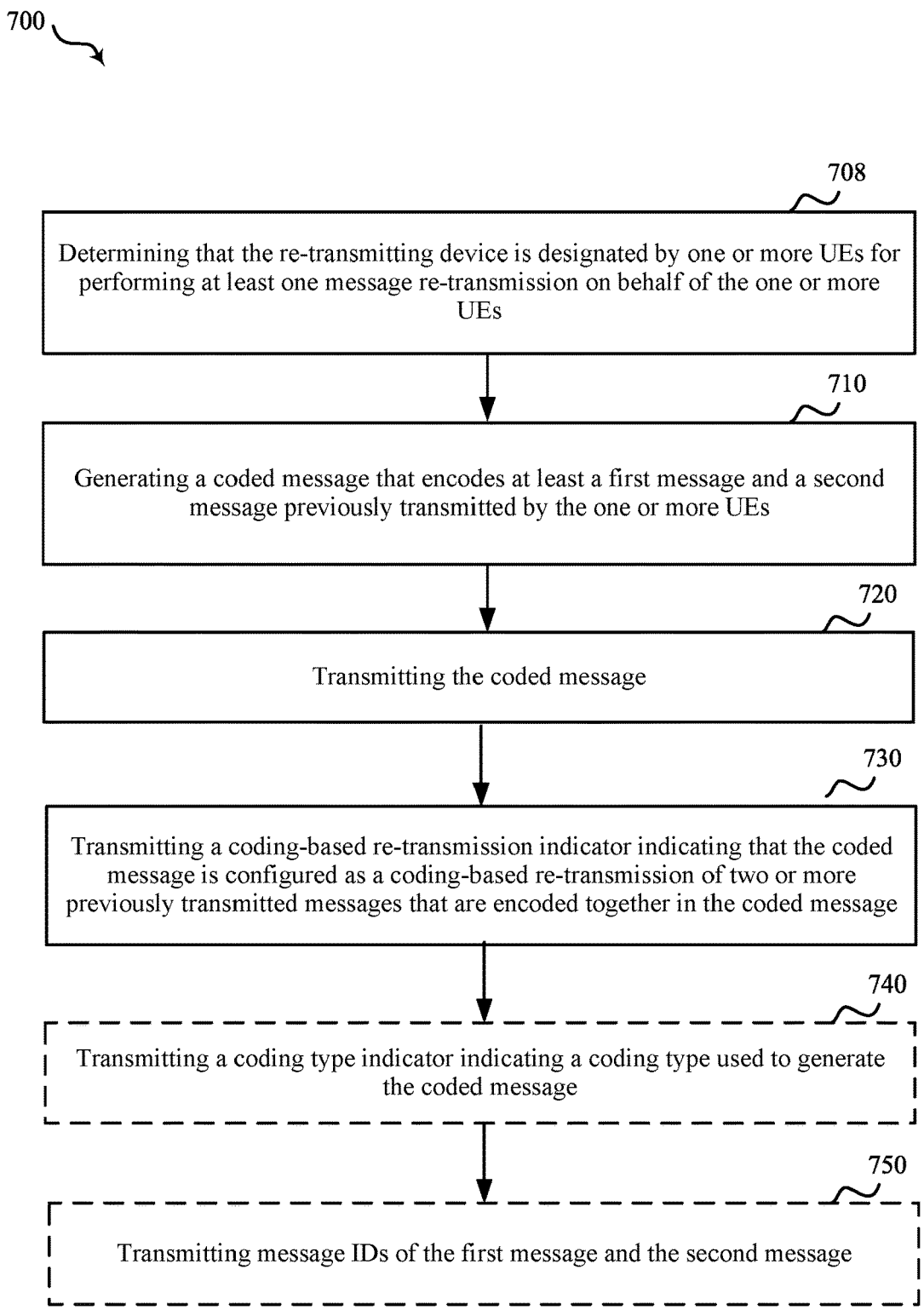
FIG. 7 is a flowchart of a second example method of wireless communication, according to some aspects.

FIG. 7 is a flowchart of a method 700 of wireless communication for a re-transmitting device. In one non-limiting aspect, for example, the method 700 may be performed by the re-transmitting device 104*a* that communicates with the receiving device 104*b* in the D2D communication system 200 in FIG. 1. In this case, the method 700 may be performed by an apparatus such as the re-transmitting device 104*a*, or more particularly, such as the re-transmission encoding module 198 being executed by a processor 912 of a UE 104 as described herein with reference to FIG. 9 below. In an aspect, for example, the method 700 of wireless communications may be performed by a UE 104 which may include a memory 916 (FIG. 9) and may be the entire UE 104 or a component of the UE 104 such as the re-transmission encoding module 198, the modem 914 (FIG. 9), the processor 912 (FIG. 9), the transceiver 902 (FIG. 9), etc.

In another non-limiting aspect, for example, the method 700 may be performed by an IAB node 220 that communicates with a UE 230 over a Uu link in the IAB system 201 in FIG. 2. In this case, the method 700 may be performed by an apparatus such as the IAB node 220, or more particularly, such as the re-transmission encoding module 198 being executed by a processor 1012 of a base station 102 as described herein with reference to FIG. 10 below. In an aspect, for example, the method 700 of wireless communications may be performed by a base station 102 which may include a memory 1016 (FIG. 10) and may be the entire base station 102 or a component of the base station 102 such as the re-transmission encoding module 198, the modem 1014 (FIG. 10), the processor 1012 (FIG. 10), the transceiver 1002 (FIG. 10), etc.

In a further non-limiting aspect, for example, the method 700 may be performed by an IAB node 210, 220 that communicates with another IAB node 210, 220 in the IAB system 201 in FIG. 2. In this case, the method 700 may be performed by an apparatus such as a base station 102, or more particularly, such as the re-transmission encoding module 198 being executed by a processor 1012 of a base station 102 as described herein with reference to FIG. 10 below. In an aspect, for example, the method 700 of wireless communications may be performed by a base station 102 which may include a memory 1016 (FIG. 10) and may be the entire base station 102 or a component of the base station 102 such as the re-transmission encoding module 198, the modem 1014 (FIG. 10), the processor 1012 (FIG. 10), the transceiver 1002 (FIG. 10), etc.

At block 708, the method 700 includes determining that the re-transmitting device is designated by one or more UEs for performing at least one message re-transmission on behalf of the one or more UEs. For example, in an aspect, in the D2D communication system 200 in FIG. 1, the re-transmitting device 104*a*, and/or a component of the re-transmitting device 104*a* such as the re-transmission encoding module 198, the modem 914 (FIG. 9), the processor 912 (FIG. 9), the transceiver 902 (FIG. 9), etc., may determine that the re-transmitting device 104*a* is designated by one or more UEs 104 for performing at least one message re-transmission on behalf of the one or more UEs 104. Accordingly, a re-transmitting device 104*a*, and/or a component of a re-transmitting device 104*a* such as the re-transmission encoding module 198, the modem 914 (FIG. 9), the processor 912 (FIG. 9), or the transceiver 902 (FIG. 9) may provide means for determining that the re-transmitting device is designated by one or more UEs for performing at least one message re-transmission on behalf of the one or more UEs.

In another aspect, for example, in the IAB system 201 in FIG. 2, an IAB node 210, 220, and/or a component of an IAB node 210, 220 such as the re-transmission encoding module 198, the modem 1014 (FIG. 10), the processor 1012 (FIG. 10), the transceiver 1002 (FIG. 10), etc., may determine that the IAB node 210, 220 is designated by one or more IAB nodes for performing at least one message re-transmission on behalf of the one or more IAB nodes. Accordingly, an IAB node 210, 220, and/or a component of an IAB node 210, 220 such as the re-transmission encoding module 198, the modem 1014 (FIG. 10), the processor 1012 (FIG. 10), or the transceiver 1002 (FIG. 10) may provide means for determining that the re-transmitting device is designated by one or more UEs for performing at least one message re-transmission on behalf of the one or more UEs.

At block 710, the method 700 includes generating a coded message that encodes at least a first message and a second message previously transmitted by the one or more UEs. For example, in an aspect, in the D2D communication system 200 in FIG. 1, the re-transmitting device 104*a*, and/or a component of the re-transmitting device 104*a* such as the re-transmission encoding module 198, the modem 914 (FIG. 9), the processor 912 (FIG. 9), the transceiver 902 (FIG. 9), etc., may generate the coded message 198*c* that encodes at least the first message 198*a* and the second message 198*b* previously transmitted by the one or more UEs 104. Accordingly, a re-transmitting device 104*a*, and/or a component of a re-transmitting device 104*a* such as the re-transmission encoding module 198, the modem 914 (FIG. 9), the processor 912 (FIG. 9), or the transceiver 902 (FIG. 9) may provide means for generating a coded message that encodes at least a first message and a second message previously transmitted by the one or more UEs.

In another aspect, for example, in the IAB system 201 in FIG. 2, an IAB node 210, 220, and/or a component of an IAB node 210, 220 such as the re-transmission encoding module 198, the modem 1014 (FIG. 10), the processor 1012 (FIG. 10), the transceiver 1002 (FIG. 10), etc., may generate the coded message 198*c* that encodes at least the first message 198*a* and the second message 198*b* previously transmitted by one or more IAB nodes. Accordingly, an IAB node 210, 220, and/or a component of an IAB node 210, 220 such as the re-transmission encoding module 198, the modem 1014 (FIG. 10), the processor 1012 (FIG. 10), or the transceiver 1002 (FIG. 10) may provide means for generating a coded message that encodes at least a first message and a second message previously transmitted by one or more UEs.

At block 720, the method 700 includes transmitting the coded message. For example, in an aspect, in the D2D communication system 200 in FIG. 1, the re-transmitting device 104*a*, and/or a component of the re-transmitting device 104*a* such as the re-transmission encoding module 198, the modem 914 (FIG. 9), the processor 912 (FIG. 9), the transceiver 902 (FIG. 9), etc., may transmit the coded message 198*c*. Accordingly, a re-transmitting device 104*a*, and/or a component of a re-transmitting device 104*a* such as the re-transmission encoding module 198, the modem 914 (FIG. 9), the processor 912 (FIG. 9), or the transceiver 902 (FIG. 9) may provide means for transmitting the coded message. In another aspect, for example, in the IAB system 201 in FIG. 2, an IAB node 210, 220, and/or a component of an IAB node 210, 220 such as the re-transmission encoding module 198, the modem 1014 (FIG. 10), the processor 1012 (FIG. 10), the transceiver 1002 (FIG. 10), etc., may transmit the coded message 198c. Accordingly, an IAB node 210, 220, and/or a component of an IAB node 210, 220 such as the re-transmission encoding module 198, the modem 1014 (FIG. 10), the processor 1012 (FIG. 10), or the transceiver 1002 (FIG. 10) may provide means for transmitting the coded message.

At block 730, the method 700 includes transmitting a coding-based re-transmission indicator indicating that the coded message is configured as a coding-based re-transmission of two or more previously transmitted messages that are encoded together in the coded message. For example, in an aspect, in the D2D communication system 200 in FIG. 1, the re-transmitting device 104a, and/or a component of the re-transmitting device 104a such as the re-transmission encoding module 198, the modem 914 (FIG. 9), the processor 912 (FIG. 9), the transceiver 902 (FIG. 9), etc., may transmit a coding-based re-transmission indicator 412 (FIG. 4) indicating that the coded message 198c is configured as a coding-based re-transmission of two or more previously transmitted messages that are encoded together in the coded message 198c. Accordingly, a re-transmitting device 104a, and/or a component of a re-transmitting device 104a such as the re-transmission encoding module 198, the modem 914 (FIG. 9), the processor 912 (FIG. 9), or the transceiver 902 (FIG. 9) may provide means for transmitting a coding-based re-transmission indicator indicating that the coded message is configured as a coding-based re-transmission of two or more previously transmitted messages that are encoded together in the coded message. In another aspect, for example, in the IAB system 201 in FIG. 2, an IAB node 210, 220, and/or a component of an IAB node 210, 220 such as the re-transmission encoding module 198, the modem 1014 (FIG. 10), the processor 1012 (FIG. 10), the transceiver 1002 (FIG. 10), etc., may transmit a coding-based re-transmission indicator 412 (FIG. 4) indicating that the coded message 198c is configured as a coding-based re-transmission of two or more previously transmitted messages that are encoded together in the coded message 198c. Accordingly, an IAB node 210, 220, and/or a component of an IAB node 210, 220 such as the re-transmission encoding module 198, the modem 1014 (FIG. 10), the processor 1012 (FIG. 10), or the transceiver 1002 (FIG. 10) may provide means for transmitting a coding-based re-transmission indicator indicating that the coded message is configured as a coding-based re-transmission of two or more previously transmitted messages that are encoded together in the coded message.

Optionally, the coded message and the coding-based re-transmission indicator may be configured to enable a receiving UE to recover at least one of the first message or the second message by decoding the coded message. For example, in an aspect, in the D2D communication system 200 in FIG. 1, the coded message 198c and the coding-based re-transmission indicator 412 (FIG. 4) may be configured to enable the receiving device 104b to recover at least one of the first message 198a or the second message 198b by decoding the coded message 198c. For example, the coding-based re-transmission indicator 412 (FIG. 4) may enable the receiving device 104b to recognize that the coded message 198c is a coding-based re-transmission of other messages, and then the receiving device 104b may recover at least one of the first message 198a or the second message 198b by decoding the coded message 198c.

Optionally, at block 740 the method 700 may further include transmitting a coding type indicator indicating a coding type used to generate the coded message. For example, in an aspect, in the D2D communication system 200 in FIG. 1, the re-transmitting device 104a, and/or a component of the re-transmitting device 104a such as the re-transmission encoding module 198, the modem 914 (FIG. 9), the processor 912 (FIG. 9), the transceiver 902 (FIG. 9), etc., may further transmit the coding type indicator 414 (FIG. 4) indicating the coding type used to generate the coded message 198c. Accordingly, a re-transmitting device 104a, and/or a component of a re-transmitting device 104a such as the re-transmission encoding module 198, the modem 914 (FIG. 9), the processor 912 (FIG. 9), or the transceiver 902 (FIG. 9) may provide means for transmitting a coding type indicator indicating a coding type used to generate the coded message.

Optionally, the coded message, the coding-based re-transmission indicator, and the coding type indicator may be configured to enable a receiving UE to recover at least one of the first message or the second message by decoding the coded message based on the coding. For example, in an aspect, in the D2D communication system 200 in FIG. 1, the coded message 198c, the coding-based re-transmission indicator 412 (FIG. 4), and the coding type indicator 414 (FIG. 4) may be configured to enable the receiving device 104b to recover at least one of the first message 198a or the second message 198b. For example, the coding-based re-transmission indicator 412 (FIG. 4) may enable the receiving device 104b to recognize that the coded message 198c is a coding-based re-transmission of other messages, and then the receiving device 104b may recover at least one of the first message 198a or the second message 198b by decoding the coded message 198c based on the coding indicated by the coding type indicator 414.

Optionally, at block 750 the method 700 may further include transmitting message IDs of the first message and the second message. For example, in an aspect, in the D2D communication system 200 in FIG. 1, the re-transmitting device 104a, and/or a component of the re-transmitting device 104a such as the re-transmission encoding module 198, the modem 914 (FIG. 9), the processor 912 (FIG. 9), the transceiver 902 (FIG. 9), etc., may further transmit message IDs including the first message ID 416 (FIG. 4) that identifies the first message 198a and the second message ID 418 (FIG. 4) that identifies the second message 198b. Accordingly, a re-transmitting device 104a, and/or a component of a re-transmitting device 104a such as the re-transmission encoding module 198, the modem 914 (FIG. 9), the processor 912 (FIG. 9), or the transceiver 902 (FIG. 9) may provide means for transmitting message IDs of the first message and the second message.

Optionally, the coded message, the coding-based re-transmission indicator, and the message IDs may be configured to enable a receiving UE to recover at least one of the first message or the second message by decoding the coded message. For example, in an aspect, in the D2D communication system 200 in FIG. 1, the coded message 198c, the coding-based re-transmission indicator 412 (FIG. 4), the first message ID 416 (FIG. 4), and the second message ID 418 (FIG. 4) may be configured to enable the receiving device 104b to recover at least one of the first message 198a or the second message 198b by decoding the coded message 198c. For example, the coding-based re-transmission indicator 412 (FIG. 4) may enable the receiving device 104b to recognize that the coded message 198c is a coding-based re-transmission of other messages, and then the receiving device 104b may decode the coded message 198c and recover at least one of the first message 198a or the second message 198b based on the first message ID 416 (FIG. 4) and the second message ID 418 (FIG. 4).

Figure 8:
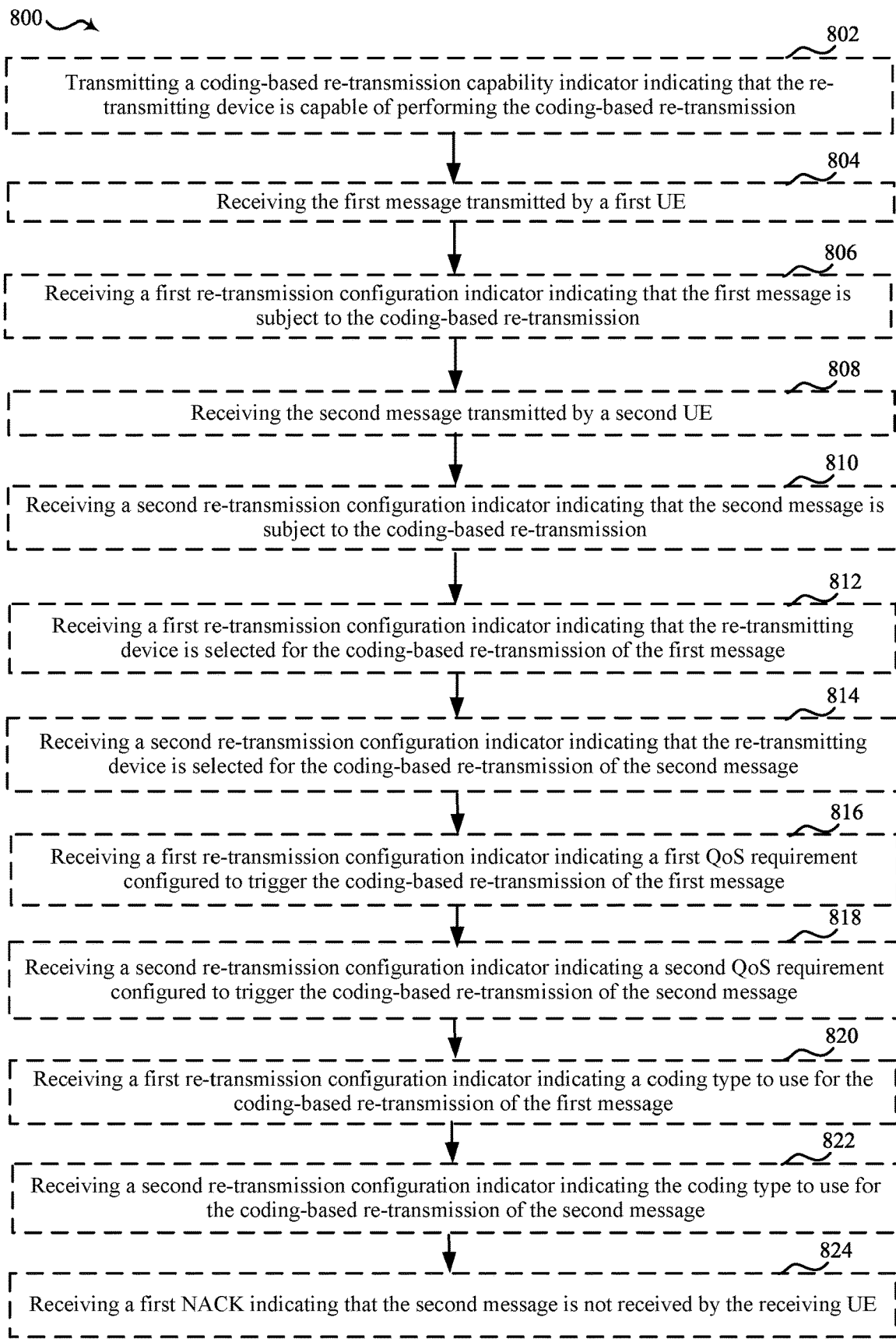
FIG. 8 is a flowchart of a third example method of wireless communication, according to some aspects.

FIG. 8 is a flowchart of a method 800 of wireless communication for a re-transmitting device. The method 800 includes further optional blocks that may be performed by a re-transmitting device in addition to the blocks in the method 700, for example, in order to determine that the re-transmitting device is designated by the one or more UEs for performing the at least one message re-transmission on behalf of the one or more UEs. For example, in an aspect, one or more of the blocks in method 800 may be performed by a re-transmitting device as part of block 708 of method 700 and/or prior to block 710 of the method 700. In one non-limiting aspect, for example, the method 800 may be performed by the re-transmitting device 104a that communicates with the receiving device 104b in the D2D communication system 200 in FIG. 1. In this case, the method 800 may be performed by an apparatus such as the re-transmitting device 104a, or more particularly, such as the re-transmission encoding module 198 being executed by a processor 912 of a UE 104 as described herein with reference to FIG. 9 below. In an aspect, for example, the method 800 of wireless communications may be performed by a UE 104 which may include a memory 916 (FIG. 9) and may be the entire UE 104 or a component of the UE 104 such as the re-transmission encoding module 198, the modem 914 (FIG. 9), the processor 912 (FIG. 9), the transceiver 902 (FIG. 9), etc.

In another non-limiting aspect, for example, the method 800 may be performed by an IAB node 220 that communicates with a UE 230 in the IAB system 201 in FIG. 2. In this case, the method 800 may be performed by an apparatus such as the IAB node 220, or more particularly, such as the re-transmission encoding module 198 being executed by a processor 1012 of a base station 102 as described herein with reference to FIG. 10 below. In an aspect, for example, the method 800 of wireless communications may be performed by a base station 102 which may include a memory 1016 (FIG. 10) and may be the entire base station 102 or a component of the base station 102 such as the re-transmission encoding module 198, the modem 1014 (FIG. 10), the processor 1012 (FIG. 10), the transceiver 1002 (FIG. 10), etc.

In a further non-limiting aspect, for example, the method 800 may be performed by an IAB node 210, 220 that communicates with another IAB node in the IAB system 201 in FIG. 2. In this case, the method 800 may be performed by an apparatus such as a base station 102, or more particularly, such as the re-transmission encoding module 198 being executed by a processor 1012 of a base station 102 as described herein with reference to FIG. 10 below. In an aspect, for example, the method 800 of wireless communications may be performed by a base station 102 which may include a memory 1016 (FIG. 10) and may be the entire base station 102 or a component of the base station 102 such as the re-transmission encoding module 198, the modem 1014 (FIG. 10), the processor 1012 (FIG. 10), the transceiver 1002 (FIG. 10), etc.

Optionally, at block 802 the method 800 may include transmitting a coding-based re-transmission capability indicator indicating that the re-transmitting device is capable of performing the coding-based re-transmission. For example, in an aspect, in the D2D communication system 200 in FIG. 1, the re-transmitting device 104a, and/or a component of the re-transmitting device 104a such as the re-transmission encoding module 198, the modem 914 (FIG. 9), the processor 912 (FIG. 9), the transceiver 902 (FIG. 9), etc., may transmit the coding-based re-transmission capability indicator 430 (FIG. 4) that indicates that the re-transmitting device 104a is capable of performing the coding-based re-transmission. For example, the re-transmitting device 104a may broadcast the coding-based re-transmission capability indicator 430 (FIG. 4) to the platoon of devices 410 (FIG. 4) in the D2D communications system 200. Accordingly, a re-transmitting device 104a, and/or a component of a re-transmitting device 104a such as the re-transmission encoding module 198, the modem 914 (FIG. 9), the processor 912 (FIG. 9), or the transceiver 902 (FIG. 9) may provide means for transmitting a coding-based re-transmission capability indicator indicating that the re-transmitting device is capable of performing the coding-based re-transmission.

Optionally, at block 804 the method 800 may further include receiving the first message transmitted by a first UE. For example, in an aspect, in the D2D communication system 200 in FIG. 1, the re-transmitting device 104a, and/or a component of the re-transmitting device 104a such as the re-transmission encoding module 198, the modem 914 (FIG. 9), the processor 912 (FIG. 9), the transceiver 902 (FIG. 9), etc., may receive the first message 198a transmitted by the first device 402 (FIG. 4). Accordingly, a re-transmitting device 104a, and/or a component of a re-transmitting device 104a such as the re-transmission encoding module 198, the modem 914 (FIG. 9), the processor 912 (FIG. 9), or the transceiver 902 (FIG. 9) may provide means for receiving the first message transmitted by a first UE.

Optionally, at block 806 the method 800 may further include receiving a first re-transmission configuration indicator indicating that the first message is subject to the coding-based re-transmission. For example, in an aspect, in the D2D communication system 200 in FIG. 1, the re-transmitting device 104a, and/or a component of the re-transmitting device 104a such as the re-transmission encoding module 198, the modem 914 (FIG. 9), the processor 912 (FIG. 9), the transceiver 902 (FIG. 9), etc., may further receive the first re-transmission configuration indicator 424 (FIG. 4) indicating that the first message 198a is subject to the coding-based re-transmission. Accordingly, a re-transmitting device 104a, and/or a component of a re-transmitting device 104a such as the re-transmission encoding module 198, the modem 914 (FIG. 9), the processor 912 (FIG. 9), or the transceiver 902 (FIG. 9) may provide means for receiving a first re-transmission configuration indicator indicating that the first message is subject to the coding-based re-transmission.

Optionally, at block 808 the method 800 may further include receiving the second message transmitted by a second UE. For example, in an aspect, in the D2D communication system 200 in FIG. 1, the re-transmitting device 104a, and/or a component of the re-transmitting device 104a such as the re-transmission encoding module 198, the modem 914 (FIG. 9), the processor 912 (FIG. 9), the transceiver 902 (FIG. 9), etc., may further receive the second message 198b transmitted by the second device 404 (FIG. 4). Accordingly, a re-transmitting device 104a, and/or a component of a re-transmitting device 104a such as the re-transmission encoding module 198, the modem 914 (FIG. 9), the processor 912 (FIG. 9), or the transceiver 902 (FIG. 9) may provide means for receiving the second message transmitted by a second UE.

Optionally, at block 810 the method 800 may further include receiving a second re-transmission configuration indicator indicating that the second message is subject to the coding-based re-transmission. For example, in an aspect, in the D2D communication system 200 in FIG. 1, the re-transmitting device 104*a*, and/or a component of the re-transmitting device 104*a* such as the re-transmission encoding module 198, the modem 914 (FIG. 9), the processor 912 (FIG. 9), the transceiver 902 (FIG. 9), etc., may further receive the second re-transmission configuration indicator 426 (FIG. 4) indicating that the second message 198*b* is subject to the coding-based re-transmission. Accordingly, a re-transmitting device 104*a*, and/or a component of a re-transmitting device 104*a* such as the re-transmission encoding module 198, the modem 914 (FIG. 9), the processor 912 (FIG. 9), or the transceiver 902 (FIG. 9) may provide means for receiving a second re-transmission configuration indicator indicating that the second message is subject to the coding-based re-transmission.

Optionally, the receiving of the first re-transmission configuration indicator and the second re-transmission configuration indicator may include receiving the first re-transmission configuration indicator and the second re-transmission configuration indicator at least in response to the transmitting of the coding-based re-transmission capability indicator. For example, in an aspect, in the D2D communication system 200 in FIG. 1, the re-transmitting device 104*a*, and/or a component of the re-transmitting device 104*a* such as the re-transmission encoding module 198, the modem 914 (FIG. 9), the processor 912 (FIG. 9), the transceiver 902 (FIG. 9), etc., may receive the first re-transmission configuration indicator 424 (FIG. 4) from the first device 402 (FIG. 4) and the second re-transmission configuration indicator 426 (FIG. 4) from the second device 404 (FIG. 4) at least in response to transmitting the coding-based re-transmission capability indicator 430 (FIG. 4) that indicates that the re-transmitting device 104*a* is capable of performing the coding-based re-transmission. Accordingly, a re-transmitting device 104*a*, and/or a component of a re-transmitting device 104*a* such as the re-transmission encoding module 198, the modem 914 (FIG. 9), the processor 912 (FIG. 9), or the transceiver 902 (FIG. 9) may provide means for receiving the first re-transmission configuration indicator and the second re-transmission configuration indicator at least in response to the transmitting of the coding-based re-transmission capability indicator.

Optionally, the generating may include generating the coded message at least in response to the receiving of the first re-transmission configuration indicator and the second re-transmission configuration indicator. For example, in an aspect, in the D2D communication system 200 in FIG. 1, the re-transmitting device 104*a*, and/or a component of the re-transmitting device 104*a* such as the re-transmission encoding module 198, the modem 914 (FIG. 9), the processor 912 (FIG. 9), the transceiver 902 (FIG. 9), etc., may generate the coded message 198*c* at least in response to receiving the first re-transmission configuration indicator 424 (FIG. 4) indicating that the first message 198*a* is subject to the coding-based re-transmission and further receiving the second re-transmission configuration indicator 426 (FIG. 4) indicating that the second message 198*b* is subject to the coding-based re-transmission. Accordingly, a re-transmitting device 104*a*, and/or a component of a re-transmitting device 104*a* such as the re-transmission encoding module 198, the modem 914 (FIG. 9), the processor 912 (FIG. 9), or the transceiver 902 (FIG. 9) may provide means for generating the coded message at least in response to the receiving of the first re-transmission configuration indicator and the second re-transmission configuration indicator.

Optionally, only the re-transmitting device may be authorized to re-transmit the first message and the second message. For example, in an aspect, in the D2D communication system 200 in FIG. 1, only the re-transmitting device 104*a* may be authorized to re-transmit the first message 198*a* and the second message 198*b*. For example, when the first device 402 (FIG. 4) sends the first re-transmission configuration indicator 424 (FIG. 4), the first device 402 (FIG. 4) delegates re-transmission of the first message 198*a* to the re-transmitting device 104*a*, and the first device 402 (FIG. 4) disables/ceases default re-transmissions of the first message 198*a* at the first device 402 (FIG. 4). Similarly, when the second device 404 (FIG. 4) sends the second re-transmission configuration indicator 426 (FIG. 4), the second device 404 (FIG. 4) delegates re-transmission of the second message 198*b* to the re-transmitting device 104*a*, and the second device 404 (FIG. 4) disables/ceases default re-transmissions of the second message 198*b* at the second device 404 (FIG. 4).

Optionally, at block 812 the method 800 may further include receiving a first re-transmission configuration indicator from a first UE that transmitted the first message, the first re-transmission configuration indicator indicating that the re-transmitting device is selected for the coding-based re-transmission of the first message. For example, in an aspect, in the D2D communication system 200 in FIG. 1, the re-transmitting device 104*a*, and/or a component of the re-transmitting device 104*a* such as the re-transmission encoding module 198, the modem 914 (FIG. 9), the processor 912 (FIG. 9), the transceiver 902 (FIG. 9), etc., may receive the first re-transmission configuration indicator 424 (FIG. 4) from the first device 402 (FIG. 4) that transmitted the first message 198*a*, the first re-transmission configuration indicator 424 (FIG. 4) indicating that the re-transmitting device 104*a* is selected for the coding-based re-transmission of the first message 198*a*. In one non-limiting aspect, for example, the first re-transmission configuration indicator 424 (FIG. 4) may include a re-transmitter ID that identifies the re-transmitting device 104*a* as being selected by the first device 402 (FIG. 4) for the coding-based re-transmission of the first message 198*a*. Alternatively, the first device 402 (FIG. 4) may transmit an indicator separate from and in addition to the first re-transmission configuration indicator 424 (FIG. 4) to indicate that the re-transmitting device 104*a* is selected for the coding-based re-transmission of the first message 198*a*. Accordingly, a re-transmitting device 104*a*, and/or a component of a re-transmitting device 104*a* such as the re-transmission encoding module 198, the modem 914 (FIG. 9), the processor 912 (FIG. 9), or the transceiver 902 (FIG. 9) may provide means for receiving a first re-transmission configuration indicator from a first UE that transmitted the first message, the first re-transmission configuration indicator indicating that the re-transmitting device is selected for the coding-based re-transmission of the first message.

Optionally, at block 814 the method 800 may include receiving a second re-transmission configuration indicator from a second UE that transmitted the second message, the second re-transmission configuration indicator indicating that the re-transmitting device is selected for the coding-based re-transmission of the second message. For example, in an aspect, in the D2D communication system 200 in FIG. 1, the re-transmitting device 104*a*, and/or a component of the re-transmitting device 104*a* such as the re-transmission encoding module 198, the modem 914 (FIG. 9), the processor 912 (FIG. 9), etc., may receive a second re-transmission configuration indicator 426

(FIG. 4) from the second device 404 (FIG. 4) that transmitted the second message 198b, the second re-transmission configuration indicator 426 (FIG. 4) indicating that the re-transmitting device 104a is selected for the coding-based re-transmission of the second message 198b. In one non-limiting aspect, for example, the second re-transmission configuration indicator 426 (FIG. 4) may include a re-transmitter ID that identifies the re-transmitting device 104a as being selected by the second device 404 (FIG. 4) for the coding-based re-transmission of the second message 198b. Alternatively, the second device 404 (FIG. 4) may transmit an indicator separate from and in addition to the second re-transmission configuration indicator 426 (FIG. 4) to indicate that the re-transmitting device 104a is selected for the coding-based re-transmission of the second message 198b. Accordingly, a re-transmitting device 104a, and/or a component of a re-transmitting device 104a such as the re-transmission encoding module 198, the modem 914 (FIG. 9), the processor 912 (FIG. 9), or the transceiver 902 (FIG. 9) may provide means for receiving a second re-transmission configuration indicator from a second UE that transmitted the second message, the second re-transmission configuration indicator indicating that the re-transmitting device is selected for the coding-based re-transmission of the second message.

Optionally, the generating may include generating the coded message at least in response to the receiving of the first re-transmission configuration indicator and the second re-transmission configuration indicator. For example, in an aspect, in the D2D communication system 200 in FIG. 1, the re-transmitting device 104a, and/or a component of the re-transmitting device 104a such as the re-transmission encoding module 198, the modem 914 (FIG. 9), the processor 912 (FIG. 9), the transceiver 902 (FIG. 9), etc., may generate the coded message 198c at least in response to receiving the first re-transmission configuration indicator 424 (FIG. 4) indicating that the re-transmitting device 104a is selected for the coding-based re-transmission of the first message 198a and further receiving the second re-transmission configuration indicator 426 (FIG. 4) indicating that the re-transmitting device 104a is selected for the coding-based re-transmission of the second message 198b. Accordingly, a re-transmitting device 104a, and/or a component of a re-transmitting device 104a such as the re-transmission encoding module 198, the modem 914 (FIG. 9), the processor 912 (FIG. 9), or the transceiver 902 (FIG. 9) may provide means for generating the coded message at least in response to the receiving of the first re-transmission configuration indicator and the second re-transmission configuration indicator.

Optionally, at block 816 the method 800 may include receiving a first re-transmission configuration indicator from a first UE that transmitted the first message, the first re-transmission configuration indicator indicating a first QoS requirement configured to trigger the coding-based re-transmission of the first message. For example, in an aspect, in the D2D communication system 200 in FIG. 1, the re-transmitting device 104a, and/or a component of the re-transmitting device 104a such as the re-transmission encoding module 198, the modem 914 (FIG. 9), the processor 912 (FIG. 9), the transceiver 902 (FIG. 9), etc., may receive the first re-transmission configuration indicator 424 (FIG. 4) from the first device 402 (FIG. 4) that transmitted the first message 198a, the first re-transmission configuration indicator 424 (FIG. 4) indicating a first QoS requirement configured to trigger the coding-based re-transmission of the first message 198a. Alternatively, the first device 402 (FIG. 4) may transmit an indicator separate from and in addition to the first re-transmission configuration indicator 424 (FIG. 4) to indicate a first QoS requirement configured to trigger the coding-based re-transmission of the first message 198a. Accordingly, a re-transmitting device 104a, and/or a component of a re-transmitting device 104a such as the re-transmission encoding module 198, the modem 914 (FIG. 9), the processor 912 (FIG. 9), or the transceiver 902 (FIG. 9) may provide means for receiving a first re-transmission configuration indicator from a first UE that transmitted the first message, the first re-transmission configuration indicator indicating a first QoS requirement configured to trigger the coding-based re-transmission of the first message.

Optionally, at block 818 the method 800 may include receiving a second re-transmission configuration indicator from a second UE that transmitted the second message, the second re-transmission configuration indicator indicating a second QoS requirement configured to trigger the coding-based re-transmission of the second message. For example, in an aspect, in the D2D communication system 200 in FIG. 1, the re-transmitting device 104a, and/or a component of the re-transmitting device 104a such as the re-transmission encoding module 198, the modem 914 (FIG. 9), the processor 912 (FIG. 9), the transceiver 902 (FIG. 9), etc., may receive the second re-transmission configuration indicator 426 (FIG. 4) from the second device 404 (FIG. 4) that transmitted the second message 198b, the second re-transmission configuration indicator 426 (FIG. 4) indicating a second QoS requirement configured to trigger the coding-based re-transmission of the second message 198b. Alternatively, the second device 404 (FIG. 4) may transmit an indicator separate from and in addition to the second re-transmission configuration indicator 426 (FIG. 4) to indicate a second QoS requirement configured to trigger the coding-based re-transmission of the second message 198b. Accordingly, a re-transmitting device 104a, and/or a component of a re-transmitting device 104a such as the re-transmission encoding module 198, the modem 914 (FIG. 9), the processor 912 (FIG. 9), or the transceiver 902 (FIG. 9) may provide means for receiving a second re-transmission configuration indicator from a second UE that transmitted the second message, the second re-transmission configuration indicator indicating a second QoS requirement configured to trigger the coding-based re-transmission of the second message.

Optionally, the generating may include generating the coded message at least in response to the receiving of the first re-transmission configuration indicator and the second re-transmission configuration indicator. For example, in an aspect, in the D2D communication system 200 in FIG. 1, the re-transmitting device 104a, and/or a component of the re-transmitting device 104a such as the re-transmission encoding module 198, the modem 914 (FIG. 9), the processor 912 (FIG. 9), the transceiver 902 (FIG. 9), etc., may generate the coded message 198c at least in response to receiving the first re-transmission configuration indicator 424 (FIG. 4) indicating the first QoS requirement configured to trigger the coding-based re-transmission of the first message 198a and receiving the second re-transmission configuration indicator 426 (FIG. 4) indicating the second QoS requirement configured to trigger the coding-based re-transmission of the second message 198b. Accordingly, a re-transmitting device 104a, and/or a component of a re-transmitting device 104a such as the re-transmission encoding module 198, the modem 914 (FIG. 9), the processor 912 (FIG. 9), or the transceiver 902 (FIG. 9) may provide means for generating the coded message at least in response to the receiving of the first re-transmission configuration indicator and the second re-transmission configuration indicator.

Optionally, at block 820 the method 800 may further include receiving a first re-transmission configuration indicator from a first UE that transmitted the first message, the first re-transmission configuration indicator indicating a coding type to use for the coding-based re-transmission of the first message. For example, in an aspect, in the D2D communication system 200 in FIG. 1, the re-transmitting device 104*a*, and/or a component of the re-transmitting device 104*a* such as the re-transmission encoding module 198, the modem 914 (FIG. 9), the processor 912 (FIG. 9), the transceiver 902 (FIG. 9), etc., may receive the first re-transmission configuration indicator 424 (FIG. 4) from the first device 402 (FIG. 4) that transmitted the first message 198*a*, the first re-transmission configuration indicator 424 (FIG. 4) indicating a coding type to use for the coding-based re-transmission of the first message 198*a*. Alternatively, the first device 402 (FIG. 4) may transmit an indicator separate from and in addition to the first re-transmission configuration indicator 424 (FIG. 4) to indicate a coding type to use for the coding-based re-transmission of the first message 198*a*. Accordingly, a re-transmitting device 104*a*, and/or a component of a re-transmitting device 104*a* such as the re-transmission encoding module 198, the modem 914 (FIG. 9), the processor 912 (FIG. 9), or the transceiver 902 (FIG. 9) may provide means for receiving a first re-transmission configuration indicator from a first UE that transmitted the first message, the first re-transmission configuration indicator indicating a coding type to use for the coding-based re-transmission of the first message.

Optionally, at block 822 the method 800 may further include receiving a second re-transmission configuration indicator from a second UE that transmitted the second message, the second re-transmission configuration indicator indicating the coding type to use for the coding-based re-transmission of the second message. For example, in an aspect, in the D2D communication system 200 in FIG. 1, the re-transmitting device 104*a*, and/or a component of the re-transmitting device 104*a* such as the re-transmission encoding module 198, the modem 914 (FIG. 9), the processor 912 (FIG. 9), the transceiver 902 (FIG. 9), etc., may receive the second re-transmission configuration indicator 426 (FIG. 4) from the second device 404 (FIG. 4) that transmitted the second message 198*b*, the second re-transmission configuration indicator 426 (FIG. 4) indicating the coding type to use for the coding-based re-transmission of the second message 198*b*. Alternatively, the second device 404 (FIG. 4) may transmit an indicator separate from and in addition to the second re-transmission configuration indicator 426 (FIG. 4) to indicate the coding type to use for the coding-based re-transmission of the second message 198*b*. Accordingly, a re-transmitting device 104*a*, and/or a component of a re-transmitting device 104*a* such as the re-transmission encoding module 198, the modem 914 (FIG. 9), the processor 912 (FIG. 9), or the transceiver 902 (FIG. 9) may provide means for receiving a second re-transmission configuration indicator from a second UE that transmitted the second message, the second re-transmission configuration indicator indicating the coding type to use for the coding-based re-transmission of the second message.

Optionally, the generating may include generating the coded message at least in response to receiving the first re-transmission configuration indicator and the second re-transmission configuration indicator. For example, in an aspect, in the D2D communication system 200 in FIG. 1, the re-transmitting device 104*a*, and/or a component of the re-transmitting device 104*a* such as the re-transmission encoding module 198, the modem 914 (FIG. 9), the processor 912 (FIG. 9), the transceiver 902 (FIG. 9), etc., may generate the coded message 198*c* at least in response to receiving the first re-transmission configuration indicator 424 (FIG. 4) indicating the coding type to use for the coding-based re-transmission of the first message 198*a* and receiving the second re-transmission configuration indicator 426 (FIG. 4) indicating the coding type to use for the coding-based re-transmission of the second message 198*b*. Accordingly, a re-transmitting device 104*a*, and/or a component of a re-transmitting device 104*a* such as the re-transmission encoding module 198, the modem 914 (FIG. 9), the processor 912 (FIG. 9), or the transceiver 902 (FIG. 9) may provide means for generating the coded message at least in response to receiving the first re-transmission configuration indicator and the second re-transmission configuration indicator.

Optionally, at block 824 the method 800 may further include receiving a first NACK indicating that the second message is not received by a receiving UE. For example, in an aspect, in the D2D communication system 200 in FIG. 1, the re-transmitting device 104*a*, and/or a component of the re-transmitting device 104*a* such as the re-transmission encoding module 198, the modem 914 (FIG. 9), the processor 912 (FIG. 9), the transceiver 902 (FIG. 9), etc., may receive the first NACK 406 (FIG. 4) from the receiving device 104*b* indicating that the second message 198*b* is not received by the receiving device 104*b*. Accordingly, a re-transmitting device 104*a*, and/or a component of a re-transmitting device 104*a* such as the re-transmission encoding module 198, the modem 914 (FIG. 9), the processor 912 (FIG. 9), or the transceiver 902 (FIG. 9) may provide means for receiving a first NACK indicating that the second message is not received by a receiving UE.

Optionally, the generating may include encoding the second message with the first message only if a second NACK corresponding to the first message is not received. For example, in an aspect, in the D2D communication system 200 in FIG. 1, the re-transmitting device 104*a*, and/or a component of the re-transmitting device 104*a* such as the re-transmission encoding module 198, the modem 914 (FIG. 9), the processor 912 (FIG. 9), the transceiver 902 (FIG. 9), etc., may encode the second message 198*b* with the first message 198*a* only if another NACK corresponding to the first message 198*a* is not received from the receiving device 104*b*. Accordingly, a re-transmitting device 104*a*, and/or a component of a re-transmitting device 104*a* such as the re-transmission encoding module 198, the modem 914 (FIG. 9), the processor 912 (FIG. 9), or the transceiver 902 (FIG. 9) may provide means for encoding the second message with the first message only if a second NACK corresponding to the first message is not received.

Figure 9:
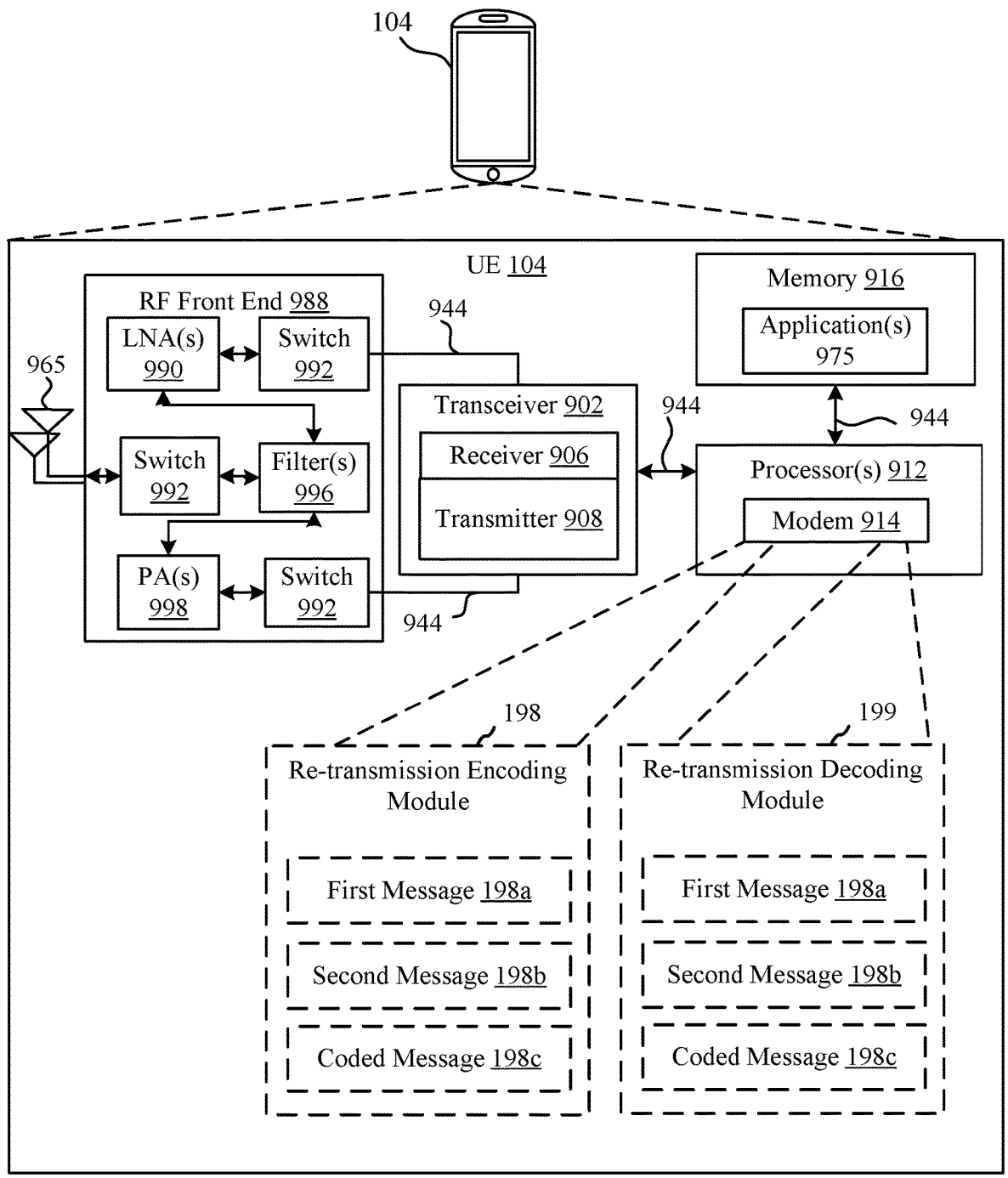
FIG. 9 is a schematic diagram of example components of a UE and/or device of FIG. 1, FIG. 2, and/or FIG. 3, according to some aspects.

Referring to FIG. 9, one example of an implementation of a UE, may be a UE 104, the re-transmitting device 104*a*, or the receiving device 104*b* in FIG. 1, or the UE 230 in FIG. 2, may include a variety of components, some of which have already been described above, but including components such as one or more processors 912 and memory 916 and transceiver 902 in communication via one or more buses 944, which may operate in conjunction with modem 914 and/or an applicable one of the re-transmission encoding module 198 or the re-transmission decoding module 199 to enable one or more of the functions described herein related to coding-based re-transmission of messages in the D2D communications system 200 in FIG. 1 and/or in the IAB system in FIG. 2. Further, the one or more processors 912, modem 914, memory 916, transceiver 902, RF front end 988, and one or more antennas 965, may be configured to support voice and/or data calls (simultaneously or non-simultaneously) in one or more radio access technologies. The antennas 965 may include one or more antennas, antenna elements, and/or antenna arrays.

In an aspect, the one or more processors 912 can include a modem 914 that uses one or more modem processors. The various functions related to an applicable one of the re-transmission encoding module 198 or the re-transmission decoding module 199 may be included in modem 914 and/or processors 912 and, in an aspect, can be executed by a single processor, while in other aspects, different ones of the functions may be executed by a combination of two or more different processors. For example, in an aspect, the one or more processors 912 may include any one or any combination of a modem processor, or a baseband processor, or a digital signal processor, or a transmit processor, or a receiver processor, or a transceiver processor associated with transceiver 902. In other aspects, some of the features of the one or more processors 912 and/or modem 914 associated with the re-transmission encoding module 198 or the re-transmission decoding module 199 may be performed by transceiver 902.

Also, memory 916 may be configured to store data used herein and/or local versions of applications 975, the re-transmission encoding module 198, the re-transmission decoding module 199, and/or one or more of subcomponents thereof being executed by at least one processor 912. Memory 916 can include any type of computer-readable medium usable by a computer or at least one processor 912, such as random access memory (RAM), read only memory (ROM), tapes, magnetic discs, optical discs, volatile memory, non-volatile memory, and any combination thereof. In an aspect, for example, memory 916 may be a non-transitory computer-readable storage medium that stores one or more computer-executable codes defining the re-transmission encoding module 198 or the re-transmission decoding module 199, and/or one or more of subcomponents thereof, and/or data associated therewith, when UE 104 is operating at least one processor 912 to execute the re-transmission encoding module 198 or the re-transmission decoding module 199, and/or one or more subcomponents thereof.

Transceiver 902 may include at least one receiver 906 and at least one transmitter 908. Receiver 906 may include hardware, firmware, and/or software code executable by a processor for receiving data, the code comprising instructions and being stored in a memory (e.g., computer-readable medium). Receiver 906 may be, for example, a radio frequency (RF) receiver. In an aspect, receiver 906 may receive signals transmitted by at least one base station 102 or another UE 104. Additionally, receiver 906 may process such received signals, and also may obtain measurements of the signals, such as, but not limited to, Ec/Io, SNR, RSRP, RSSI, etc. Transmitter 908 may include hardware, firmware, and/or software code executable by a processor for transmitting data, the code comprising instructions and being stored in a memory (e.g., computer-readable medium). A suitable example of transmitter 908 may include, but is not limited to, an RF transmitter.

Moreover, in an aspect, UE 104 may include RF front end 988, which may operate in communication with one or more antennas 965 and transceiver 902 for receiving and transmitting radio transmissions, for example, wireless communications transmitted by at least one base station 102 or wireless transmissions transmitted by UE 104. RF front end 988 may be connected to one or more antennas 965 and can include one or more low-noise amplifiers (LNAs) 990, one or more switches 992, one or more power amplifiers (PAs) 998, and one or more filters 996 for transmitting and receiving RF signals.

In an aspect, LNA 990 can amplify a received signal at a desired output level. In an aspect, each LNA 990 may have a specified minimum and maximum gain values. In an aspect, RF front end 988 may use one or more switches 992 to select a particular LNA 990 and an associated specified gain value based on a desired gain value for a particular application.

Further, for example, one or more PA(s) 998 may be used by RF front end 988 to amplify a signal for an RF output at a desired output power level. In an aspect, each PA 998 may have specified minimum and maximum gain values. In an aspect, RF front end 988 may use one or more switches 992 to select a particular PA 998 and its specified gain value based on a desired gain value for a particular application.

Also, for example, one or more filters 996 can be used by RF front end 988 to filter a received signal to obtain an input RF signal. Similarly, in an aspect, for example, a respective filter 996 can be used to filter an output from a respective PA 998 to produce an output signal for transmission. In an aspect, each filter 996 can be connected to a specific LNA 990 and/or PA 998. In an aspect, RF front end 988 can use one or more switches 992 to select a transmit or receive path using a specified filter 996, LNA 990, and/or PA 998, based on a configuration as specified by transceiver 902 and/or processor 912.

As such, transceiver 902 may be configured to transmit and receive wireless signals through one or more antennas 965 via RF front end 988. In an aspect, transceiver may be tuned to operate at specified frequencies such that UE 104 can communicate with, for example, one or more base stations 102 or one or more cells associated with one or more base stations 102. In an aspect, for example, modem 914 can configure transceiver 902 to operate at a specified frequency and power level based on the UE configuration of the UE 104 and the communication protocol used by modem 914.

In an aspect, modem 914 can be a multiband-multimode modem, which can process digital data and communicate with transceiver 902 such that the digital data is sent and received using transceiver 902. In an aspect, modem 914 can be multiband and be configured to support multiple frequency bands for a specific communications protocol. In an aspect, modem 914 can be multimode and be configured to support multiple operating networks and communications protocols. In an aspect, modem 914 can control one or more components of UE 104 (e.g., RF front end 988, transceiver 902) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

Figure 10:
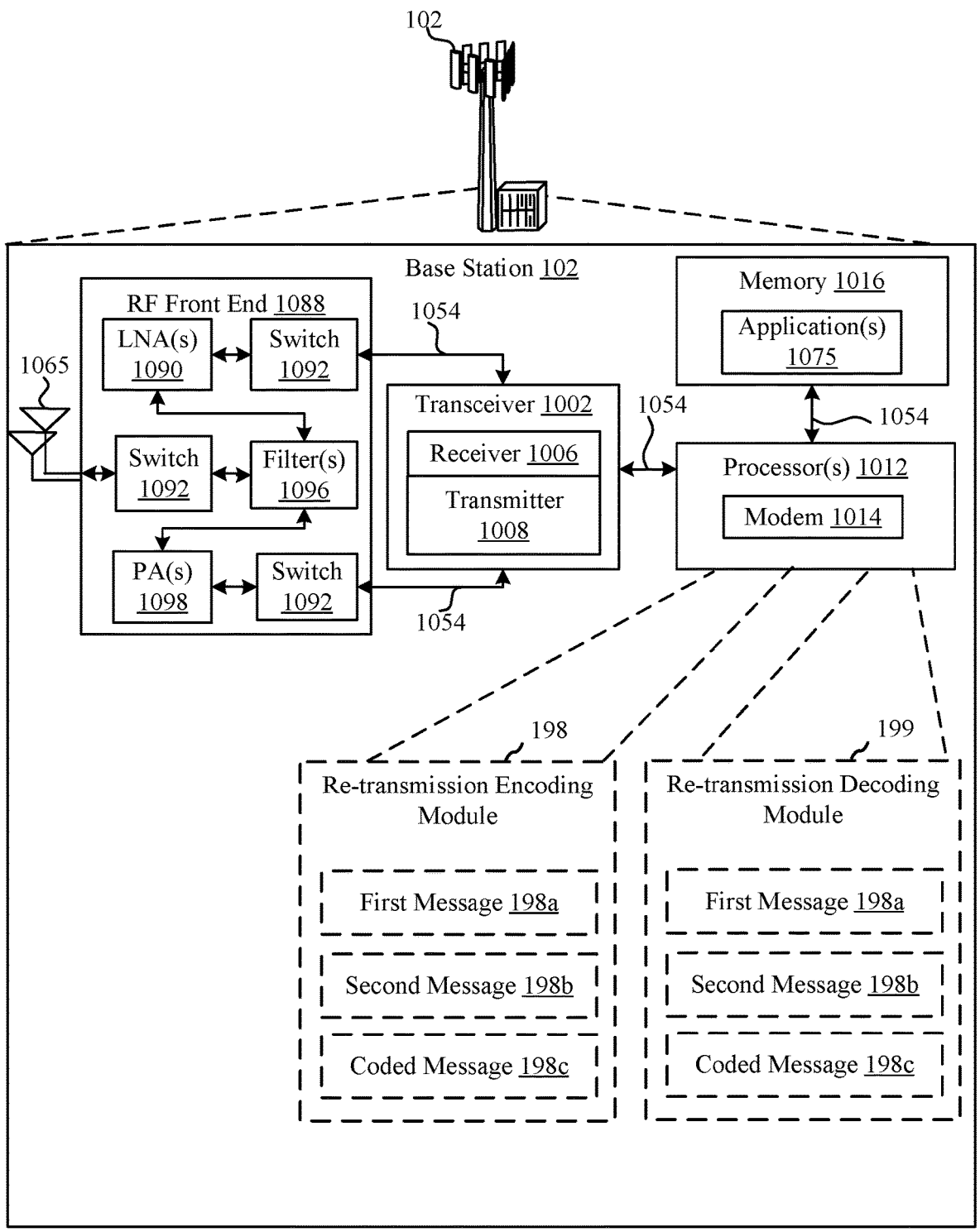
FIG. 10 is a schematic diagram of example components of the base station of FIG. 1, FIG. 2, and/or FIG. 3, according to some aspects.

Referring to FIG. 10, one example of an implementation of a base station, which may be a base station 102 and/or gNB 180 in FIG. 1, or an IAB node 210, 220 in FIG. 2, may include a variety of components, some of which have already been described above, but including components such as one or more processors 1012 and memory 1016 and transceiver 1002 in communication via one or more buses 1054, which may operate in conjunction with modem 1014 and/or an applicable one of the re-transmission encoding module 198 or the re-transmission decoding module 199 to enable one or more of the functions described herein related to coding-based re-transmission of messages in the D2D communications system 200 in FIG. 1 and/or in the IAB system in FIG. 2. Further, the one or more processors 1012, modem 1014, memory 1016, transceiver 1002, RF front end 1088, and one or more antennas 1065, may be configured to support voice and/or data calls (simultaneously or non-simultaneously) in one or more radio access technologies. The antennas 1065 may include one or more antennas, antenna elements, and/or antenna arrays.

The transceiver 1002, receiver 1006, transmitter 1008, one or more processors 1012, memory 1016, applications 1075, buses 1054, RF front end 1088, LNAs 1090, switches 1092, filters 1096, PAs 1098, and one or more antennas 1065 may be the same as or similar to the corresponding components of UE 104, as described above, but configured or otherwise programmed for base station operations as opposed to UE operations.

The following provides an overview of further examples of the present disclosure:

1. A method of wireless communication at a receiving device, comprising: receiving, from a re-transmitting device designated by one or more devices for performing at least one message re-transmission on behalf of the one or more devices, a coded message that encodes at least a first message and a second message, wherein the receiving device has failed to receive at least the second message from one of the one or more devices; receiving, from the re-transmitting device, a coding-based re-transmission indicator indicating that the coded message is configured as a coding-based re-transmission of two or more previously transmitted messages that are encoded together in the coded message; and recovering, in response to receiving the coding-based re-transmission indicator, at least the second message by decoding the coded message.

2. The method of example 1, wherein only the re-transmitting device is authorized to re-transmit the first message and the second message.

3. The method of any of examples 1 or 2, further comprising: receiving the first message from a first device; receiving a first re-transmission configuration indicator indicating that the first message is subject to the coding-based re-transmission; caching the first message at the receiving device in response to receiving the first re-transmission configuration indicator; and wherein the recovering of at least the second message includes using at least the first message for decoding the coded message.

4. The method of example 3, wherein the caching comprises caching the first message for a duration of a re-transmission time window, wherein the coding-based re-transmission is applied only to recent messages received within the re-transmission time window.

5. The method of any of examples 1 and 2, further comprising: receiving a coding type indicator indicating a coding type used to generate the coded message; and wherein the recovering of at least the second message comprises decoding the coded message based at least on the coding type.

6. The method of any of examples 1 and 2, further comprising: receiving message identifiers (IDs) of the first message and the second message; and wherein the recovering of at least the second message comprises recovering the second message based at least on the message IDs of the first message and the second message.

7. The method of any of the preceding examples, wherein receiving the coded message comprises receiving over a device-to-device (D2D) communication link in a vehicle-to-everything (V2X) communication.

8. The method of example 7, wherein the re-transmitting device is a relay or a road side unit (RSU).

9. The method of example 7, wherein the receiving device is part of a platoon including a first device that transmitted the first message, a second device that transmitted the second message, and the re-transmitting device, wherein the re-transmitting device is a platoon leader.

10. The method of any of examples 1 to 6, wherein receiving the coded message comprises receiving over a UE-to-Universal Mobile Telecommunications System (UMTS) link (Uu link) in an Integrated Access and Backhaul (IAB) downlink communication in a radio access network (RAN).

11. The method of example 10, wherein receiving the coded message comprises receiving from a relay designated by one or more IAB nodes for performing the at least one message re-transmission on behalf of the one or more IAB nodes.

12. The method of any of examples 1 or 2, further comprising: receiving the first message; determining that the second message is not received by the receiving device; transmitting a negative acknowledgement (NACK) indicating that the second message is not received by the receiving device; and wherein the recovering of at least the second message comprises using the first message to decode the coded message, wherein the coded message encodes the second message with the first message at least in response to the first message being received by the receiving device.

13. A method of wireless communication at a re-transmitting device, comprising: determining that the re-transmitting device is designated by one or more devices for performing at least one message re-transmission on behalf of the one or more devices; generating a coded message that encodes at least a first message and a second message previously transmitted by the one or more devices; transmitting the coded message; and transmitting a coding-based re-transmission indicator indicating that the coded message is configured as a coding-based re-transmission of two or more previously transmitted messages that are encoded together in the coded message.

14. The method of example 13, wherein the coded message and the coding-based re-transmission indicator are configured to enable a receiving device to recover at least one of the first message or the second message by decoding the coded message.

15. The method of any of examples 13 or 14, wherein determining that the re-transmitting device is designated by the one or more devices for performing the at least one message re-transmission on behalf of the one or more devices comprises: receiving the first message transmitted by a first device; receiving a first re-transmission configuration indicator indicating that the first message is subject to the coding-based re-transmission; receiving the second message transmitted by a second device; receiving a second re-transmission configuration indicator indicating that the second message is subject to the coding-based re-transmission; and wherein the generating comprises generating at least in response to receiving the first re-transmission configuration indicator and the second re-transmission configuration indicator.

16. The method of example 15, wherein determining that the re-transmitting device is designated by the one or more devices for performing the at least one message re-transmission on behalf of the one or more devices further comprises: transmitting a coding-based re-transmission capability indicator indicating that the re-transmitting device is capable of performing the coding-based re-transmission; and wherein the receiving of the first re-transmission configuration indicator and the second re-transmission configuration indicator comprises receiving the first re-transmission configuration indicator and the second re-transmission configuration indicator at least in response to the transmitting of the coding-based re-transmission capability indicator.

17. The method of any of examples 15 or 16, wherein only the re-transmitting device is authorized to re-transmit the first message and the second message.

18. The method of any of examples 13 or 14, further comprising: transmitting a coding type indicator indicating a coding type used to generate the coded message, wherein the coded message, the coding-based re-transmission indicator, and the coding type indicator are configured to enable a receiving device to recover at least one of the first message or the second message by decoding the coded message based on the coding type.

19. The method of any of examples 13 or 14, further comprising: transmitting message identifiers (IDs) of the first message and the second message, wherein the coded message, the coding-based re-transmission indicator, and the message IDs are configured to enable a receiving device to recover at least one of the first message or the second message by decoding the coded message.

20. The method of any of examples 13 or 14, wherein determining that the re-transmitting device is designated by the one or more devices for performing the at least one message re-transmission on behalf of the one or more devices comprises: receiving a first re-transmission configuration indicator from a first device that transmitted the first message, the first re-transmission configuration indicator indicating that the re-transmitting device is selected for the coding-based re-transmission of the first message; receiving a second re-transmission configuration indicator from a second device that transmitted the second message, the second re-transmission configuration indicator indicating that the re-transmitting device is selected for the coding-based re-transmission of the second message; and wherein the generating comprises generating at least in response to receiving the first re-transmission configuration indicator and the second re-transmission configuration indicator.

21. The method of any of examples 13 or 14, wherein determining that the re-transmitting device is designated by the one or more devices for performing the at least one message re-transmission on behalf of the one or more devices comprises: receiving a first re-transmission configuration indicator from a first device that transmitted the first message, the first re-transmission configuration indicator indicating a first quality of service (QoS) requirement configured to trigger the coding-based re-transmission of the first message; receiving a second re-transmission configuration indicator from a second device that transmitted the second message, the second re-transmission configuration indicator indicating a second QoS requirement configured to trigger the coding-based re-transmission of the second message; and wherein the generating comprises generating at least in response to receiving the first re-transmission configuration indicator and the second re-transmission configuration indicator.

22. The method of any of examples 13 or 14, wherein determining that the re-transmitting device is designated by the one or more devices for performing the at least one message re-transmission on behalf of the one or more devices comprises: receiving a first re-transmission configuration indicator from a first device that transmitted the first message, the first re-transmission configuration indicator indicating a coding type to use for the coding-based re-transmission of the first message; receiving a second re-transmission configuration indicator from a second device that transmitted the second message, the second re-transmission configuration indicator indicating the coding type to use for the coding-based re-transmission of the second message; and wherein the generating comprises generating at least in response to receiving the first re-transmission configuration indicator and the second re-transmission configuration indicator.

23. The method of any of claim 13 or 14, wherein determining that the re-transmitting device is designated by the one or more devices for performing the at least one message re-transmission on behalf of the one or more devices comprises: receiving a first negative acknowledgement (NACK) indicating that the second message is not received by a receiving device; and wherein the generating comprises encoding the second message with the first message only if a second NACK corresponding to the first message is not received.

24. The method of any of examples 13 or 14, wherein determining that the re-transmitting device is designated by the one or more devices for performing the at least one message re-transmission on behalf of the one or more devices comprises: receiving a first re-transmission configuration indicator indicating at least one of: that the first message is subject to the coding-based re-transmission, that the re-transmitting device is selected for the coding-based re-transmission of the first message, a first quality of service (QoS) requirement configured to trigger the coding-based retransmission of the first message, and a coding type to use for the coding-based re-transmission of the second message; receiving a second re-transmission configuration indicator indicating at least one of: that the second message is subject to the coding-based re-transmission, that the re-transmitting device is selected for the coding-based re-transmission of the second message, a second quality of service (QoS) requirement configured to trigger the coding-based retransmission of the second message, and a coding type to use for the coding-based re-transmission of the second message; wherein the generating comprises generating at least in response to receiving corresponding indications of the first re-transmission configuration indicator and the second re-transmission configuration indicator.

25. The method of any of examples 13 to 24, wherein transmitting the coded message comprises transmitting over a device-to-device (D2D) communication link in a vehicle-to-everything (V2X) communication.

26. The method of example 25, wherein the re-transmitting device is a relay, a road side unit (RSU), or a platoon leader of a platoon including a first device that transmitted the first message, a second device that transmitted the second message, and the re-transmitting device.

27. The method of any of examples 13 to 24, wherein transmitting the coded message comprises transmitting over a UE-to-Universal Mobile Telecommunications System (UMTS) link (Uu link) in an Integrated Access and Backhaul (IAB) downlink communication in a radio access network (RAN).

28. The method of example 27, wherein the re-transmitting device comprises a relay, wherein determining that the relay is designated by the one or more devices comprises determining that the relay is designated by one or more IAB nodes for performing the at least one message re-transmission on behalf of the one or more IAB nodes.

29. A receiving device for wireless communication, comprising: a memory storing instructions; and a processor in communication with the memory, wherein the processor is configured to: receive, from a re-transmitting device designated by one or more devices for performing at least one message re-transmission on behalf of the one or more devices, a coded message that encodes at least a first message and a second message, wherein the receiving device has failed to receive at least the second message from one of the one or more devices; receive, from the re-transmitting device, a coding-based re-transmission indicator indicating that the coded message is configured as a coding-based re-transmission of two or more previously transmitted messages that are encoded together in the coded message; and recover, in response to receiving the coding-based re-transmission indicator, at least the second message by decoding the coded message.

30. A re-transmitting device for wireless communication, comprising: a memory storing instruction; and a processor in communication with the memory, wherein the processor is configured to: determine that the re-transmitting device is designated by one or more devices for performing at least one message re-transmission on behalf of the one or more devices; generate a coded message that encodes at least a first message and a second message previously transmitted by the one or more devices; transmit the coded message; and transmit a coding-based re-transmission indicator indicating that the coded message is configured as a coding-based re-transmission of two or more previously transmitted messages that are encoded together in the coded message.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more". The word "exemplary" is used herein to mean "serving as an example, instance, or illustration". Any aspect described herein as "exemplary" is not necessarily to be construed as preferred or advantageous over other aspects. Unless specifically stated otherwise, the term "some" refers to one or more. Combinations such as "at least one of A, B, or C", "one or more of A, B, or C", "at least one of A, B, and C", "one or more of A, B, and C", and "A, B, C, or any combination thereof" include any combination of A, B, and/or C, and may include multiples of A, multiples of B, or multiples of C. Specifically, combinations such as "at least one of A, B, or C", "one or more of A, B, or C", "at least one of A, B, and C", "one or more of A, B, and C", and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module", "mechanism", "element", "device", and the like may not be a substitute for the word "means". As such, no claim element is to be construed as a means plus function unless the element is expressly recited using the phrase "means for".

What is claimed is:

1. A method of wireless communication at a receiving device, comprising:
    receiving, from a re-transmitting device, a coded message that encodes at least a first message and a second message, wherein the receiving device has failed to receive at least the second message, wherein the first message and the second message are received by the re-transmitting device from one or more devices and are encoded in the coded message by the re-transmitting device responsive to receiving a first and a second re-transmission configuration indicator from the one or more devices, wherein the first re-transmission configuration indicator indicates that the re-transmitting device is designated by the one or more devices for a coding-based re-transmission of the first message on behalf of the one or more devices, wherein the second re-transmission configuration indicator indicates that the re-transmitting device is designated by the one or more devices for a coding-based re-transmission of the second message on behalf of the one or more devices;
    receiving, from the re-transmitting device, a coding-based re-transmission indicator indicating that the coded message is configured as a coding-based re-transmission of two or more previously transmitted messages that are encoded together in the coded message; and
    recovering, in response to receiving the coding-based re-transmission indicator, at least the second message by decoding the coded message.

2. The method of claim 1, wherein only the re-transmitting device is authorized to re-transmit at least the first message and the second message.

3. The method of claim 1, further comprising:
    receiving the first message from a first device;
    receiving the first re-transmission configuration indicator indicating that the first message is subject to the coding-based re-transmission;
    caching the first message at the receiving device in response to receiving the first re-transmission configuration indicator; and
    wherein the recovering of at least the second message includes using at least the first message for decoding the coded message.

4. The method of claim 3, wherein the caching comprises caching the first message for a duration of a re-transmission time window, wherein the coding-based re-transmission is applied only to recent messages received within the re-transmission time window.

5. The method of claim 1, further comprising:
    receiving a coding type indicator indicating a coding type used to generate the coded message; and
    wherein the recovering of at least the second message comprises decoding the coded message based at least on the coding type.

6. The method of claim 1, further comprising:
receiving message identifiers (IDs) of the first message and the second message; and
wherein the recovering of at least the second message comprises recovering the second message based at least on the message IDs of the first message and the second message.

7. The method of claim 1, wherein receiving the coded message comprises receiving over a device-to-device (D2D) communication link in a vehicle-to-everything (V2X) communication.

8. The method of claim 7, wherein the re-transmitting device is a relay or a road side unit (RSU).

9. The method of claim 7, wherein the receiving device is part of a platoon including a first device that transmitted the first message, a second device that transmitted the second message, and the re-transmitting device, wherein the re-transmitting device is a platoon leader.

10. The method of claim 1, wherein receiving the coded message comprises receiving over a UE-to-Universal Mobile Telecommunications System (UMTS) link (Uu link) in an Integrated Access and Backhaul (IAB) downlink communication in a radio access network (RAN).

11. The method of claim 10, wherein receiving the coded message comprises receiving from a relay designated by one or more IAB nodes for performing at least one message re-transmission on behalf of the one or more IAB nodes.

12. The method of claim 1, further comprising:
receiving the first message;
determining that the second message is not received by the receiving device;
transmitting a negative acknowledgement (NACK) indicating that the second message is not received by the receiving device; and
wherein the recovering of at least the second message comprises using the first message to decode the coded message, wherein the coded message encodes the second message with the first message at least in response to the first message being received by the receiving device.

13. A method of wireless communication at a re-transmitting device, comprising:
receiving a first message and a second message transmitted by one or more devices;
receiving a first re-transmission configuration indicator indicating that the re-transmitting device is designated by the one or more devices for a coding-based re-transmission of the first message on behalf of the one or more devices;
receiving a second re-transmission configuration indicator indicating that the re-transmitting device is designated by the one or more devices for a coding-based re-transmission of the second message on behalf of the one or more devices;
generating, responsive to receiving the first re-transmission configuration indicator and the second re-transmission configuration indicator, a coded message that encodes at least the first message and the second message;
transmitting the coded message; and
transmitting a coding-based re-transmission indicator indicating that the coded message is configured as a coding-based re-transmission of two or more previously transmitted messages that are encoded together in the coded message.

14. The method of claim 13, wherein the coded message and the coding-based re-transmission indicator are configured to enable a receiving device to recover at least one of the first message or the second message by decoding the coded message.

15. The method of claim 13,
wherein the first re-transmission configuration indicator indicates that the first message is subject to the coding-based re-transmission of the first message; and
wherein the second re-transmission configuration indicator indicates that the second message is subject to the coding-based re-transmission of the second message.

16. The method of claim 15, further comprising:
transmitting a coding-based re-transmission capability indicator indicating that the re-transmitting device is capable of performing coding-based re-transmission; and
wherein the receiving of the first re-transmission configuration indicator and the second re-transmission configuration indicator comprises receiving the first re-transmission configuration indicator and the second re-transmission configuration indicator at least in response to the transmitting of the coding-based re-transmission capability indicator.

17. The method of claim 15, wherein only the re-transmitting device is authorized to re-transmit the first message and the second message.

18. The method of claim 13, further comprising:
transmitting a coding type indicator indicating a coding type used to generate the coded message, wherein the coded message, the coding-based re-transmission indicator, and the coding type indicator are configured to enable a receiving device to recover at least one of the first message or the second message by decoding the coded message based on the coding type.

19. The method of claim 13, further comprising:
transmitting message identifiers (IDs) of the first message and the second message, wherein the coded message, the coding-based re-transmission indicator, and the message IDs are configured to enable a receiving device to recover at least one of the first message or the second message by decoding the coded message.

20. The method of claim 13,
wherein the first re-transmission configuration indicator is received from a first device that transmitted the first message, the first re-transmission configuration indicator indicating that the re-transmitting device is selected for the coding-based re-transmission of the first message; and
wherein the second re-transmission configuration indicator is received from a second device that transmitted the second message, the second re-transmission configuration indicator indicating that the re-transmitting device is selected for the coding-based re-transmission of the second message.

21. The method of claim 13,
wherein the first re-transmission configuration indicator is received from a first device that transmitted the first message, the first re-transmission configuration indicator indicating a first quality of service (QoS) requirement configured to trigger the coding-based re-transmission of the first message; and
wherein the second re-transmission configuration indicator is received from a second device that transmitted the second message, the second re-transmission configuration indicator indicating a second QoS requirement configured to trigger the coding-based re-transmission of the second message.

22. The method of claim 13,
wherein the first re-transmission configuration indicator is received from a first device that transmitted the first message, the first re-transmission configuration indicator indicating a coding type to use for the coding-based re-transmission of the first message; and
wherein the second re-transmission configuration indicator is received from a second device that transmitted the second message, the second re-transmission configuration indicator indicating the coding type to use for the coding-based re-transmission of the second message.

23. The method of claim 13, further comprising:
receiving a first negative acknowledgement (NACK) indicating that the second message is not received by a receiving device; and
wherein the generating further comprises encoding the second message with the first message only if a second NACK corresponding to the first message is not received.

24. The method of claim 13,
wherein the first re-transmission configuration indicator indicates at least one of: that the first message is subject to the coding-based re-transmission of the first message, that the re-transmitting device is selected for the coding-based re-transmission of the first message, a first quality of service (QoS) requirement configured to trigger the coding-based re-transmission of the first message, and a coding type to use for the coding-based re-transmission of the second message; and
wherein the second re-transmission configuration indicator indicating at least one of: that the second message is subject to the coding-based re-transmission of the second message, that the re-transmitting device is selected for the coding-based re-transmission of the second message, a second quality of service (QoS) requirement configured to trigger the coding-based re-transmission of the second message, and the coding type to use for the coding-based re-transmission of the second message.

25. The method of claim 13, wherein transmitting the coded message comprises transmitting over a device-to-device (D2D) communication link in a vehicle-to-everything (V2X) communication.

26. The method of claim 25, wherein the re-transmitting device is a relay, a road side unit (RSU), or a platoon leader of a platoon including a first device that transmitted the first message, a second device that transmitted the second message, and the re-transmitting device.

27. The method of claim 13, wherein transmitting the coded message comprises transmitting over a UE-to-Universal Mobile Telecommunications System (UMTS) link (Uu link) in an Integrated Access and Backhaul (IAB) downlink communication in a radio access network (RAN).

28. The method of claim 27, wherein the re-transmitting device comprises a relay, wherein determining that the relay is designated by the one or more devices comprises determining that the relay is designated by one or more IAB nodes for performing at least one message re-transmission on behalf of the one or more IAB nodes.

29. A receiving device for wireless communication, comprising:
a memory storing instructions; and
a processor in communication with the memory, wherein the processor is configured to:
receive, from a re-transmitting device, a coded message that encodes at least a first message and a second message, wherein the receiving device has failed to receive at least the second message, wherein the first message and the second message are received by the re-transmitting device from one or more devices and are encoded in the coded message by the re-transmitting device responsive to receiving a first and a second re-transmission configuration indicator from the one or more devices, wherein the first re-transmission configuration indicator indicates that the re-transmitting device is designated by the one or more devices for a coding-based re-transmission of the first message on behalf of the one or more devices, wherein the second re-transmission configuration indicator indicates that the re-transmitting device is designated by the one or more devices for a coding-based re-transmission of the second message on behalf of the one or more devices;
receive, from the re-transmitting device, a coding-based re-transmission indicator indicating that the coded message is configured as a coding-based re-transmission of two or more previously transmitted messages that are encoded together in the coded message; and
recover, in response to receiving the coding-based re-transmission indicator, at least the second message by decoding the coded message.

30. A re-transmitting device for wireless communication, comprising:
a memory storing instructions; and
a processor in communication with the memory, wherein the processor is configured to:
receive a first message and a second message transmitted by one or more devices;
receiving a first re-transmission configuration indicator indicating that the re-transmitting device is designated by the one or more devices for a coding-based re-transmission of the first message on behalf of the one or more devices;
receive a second re-transmission configuration indicator indicating that the re-transmitting device is designated by the one or more devices for a coding-based re-transmission of the second message on behalf of the one or more devices;
generate, responsive to receiving the first re-transmission configuration indicator and the second re-transmission configuration indicator, a coded message that encodes at least the first message and the second message;
transmit the coded message; and
transmit a coding-based re-transmission indicator indicating that the coded message is configured as a coding-based re-transmission of two or more previously transmitted messages that are encoded together in the coded message.

* * * * *